US012596689B2

(12) United States Patent
Sarfare et al.

(10) Patent No.: US 12,596,689 B2
(45) Date of Patent: Apr. 7, 2026

(54) DYNAMIC STORAGE JOURNALING PARTITIONS FOR EFFICIENT RESOURCE USE AND IMPROVED SYSTEM THROUGHPUT

(71) Applicant: NetApp, Inc., San Jose, CA (US)

(72) Inventors: Parag Sarfare, San Jose, CA (US); Asif Pathan, San Jose, CA (US); Amit Borase, San Jose, CA (US); Nikhil Mattankot, Pleasanton, CA (US); Sudheer Kumar Vavilapalli, San Jose, CA (US); Stephen Wu, Sacremento, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/862,887

(22) Filed: Jul. 12, 2022

(65) Prior Publication Data

US 2024/0020278 A1    Jan. 18, 2024

(51) Int. Cl.
*G06F 16/21* (2019.01)

(52) U.S. Cl.
CPC .................................. *G06F 16/21* (2019.01)

(58) Field of Classification Search
CPC ...... G06F 16/21; G06F 16/18; G06F 16/1805; G06F 16/1815
See application file for complete search history.

(56) References Cited

U.S. PATENT DOCUMENTS

| | | | | |
|---|---|---|---|---|
| 2017/0147449 A1* | 5/2017 | DeSantis | ............... | G06F 3/0622 |
| 2019/0012336 A1* | 1/2019 | Schreter | ............... | G06F 3/0644 |
| 2019/0138654 A1* | 5/2019 | Arora | .................. | G06F 9/45558 |
| 2019/0238312 A1* | 8/2019 | Dickens, III | .......... | G06F 3/0673 |

(Continued)

OTHER PUBLICATIONS

Conrad J., "What is Container Orchestration? Definition, Key Benefits, and Tools," Cloud, Aug. 2020, Capital One, Retrieved from the Internet at: https://www.capitalone.com/tech/cloud/what-is-container-orchestration/, 10 pages.

(Continued)

*Primary Examiner* — Amy Ng
*Assistant Examiner* — Dustin D Eyers
(74) *Attorney, Agent, or Firm* — Jaffery Watson Hamilton & DeSanctis LLP

(57) ABSTRACT

Systems and methods are for improving latency and throughput for metadata-heavy workloads and/or workloads including metadata bursts by decoupling data journal records and metadata-only journal records are provided. According to one embodiment, expedited and independent space reclamation is facilitated by differentiating between various types of journal records chains of which should be retained until different conditions are met. For example, data journal records may be added to data journal record chains within a persistent KV store and metadata-only journal records may be added to metadata-only journal record chains within the persistent KV store. Reclamation of spaced utilized by a data journal record chain may be reclaimed after both remote node data flush has been completed and the completion of a local CP for all records in the chain, whereas records of a metadata-only journal chain may be freed independently upon completion of a local CP for all records.

20 Claims, 11 Drawing Sheets

(56)                    References Cited

U.S. PATENT DOCUMENTS

| | | | | |
|---|---|---|---|---|
| 2020/0174891 | A1* | 6/2020 | Shang | G06F 3/0641 |
| 2020/0311137 | A1* | 10/2020 | Gupta | G06F 3/067 |
| 2020/0349030 | A1* | 11/2020 | Meadowcroft | G06F 11/1471 |
| 2022/0374519 | A1* | 11/2022 | Botelho | G06F 11/1464 |

OTHER PUBLICATIONS

"Data Services for Database Containers & Stateful Containers," Portworx, Dec. 2021, Retrieved from the Internet at: https://portworx.com/products/portworx-enterprise/, 10 pages.

Docker vs Virtual Machines (VMs) : A Practical Guide to Docker Containers and VMs [online]. Jan. 16, 2020. Weaveworks, 2021, 8 pages. [retrieved on Nov. 9, 2021]. Retrieved from the Internet: ">" title="Link: https://www.weave.works/blog/a-practical-guide-to-choosing-between-docker-containers-and-vms>" >https://www.weave.works/blog/a-practical-guide-to-choosing-between-docker-containers-and-vms.

"How to Build a Containers a a Service Platform in Kubernetes," 2021, Portworx, Retrieved from the Internet at: https://portworx.com/containers-as-a-service/, 7 pages.

Joshi A., "From there to here, from here to there, Containers are Everywhere!," Dec. 16, 2020 [online], Nutanix. Dev, 2021, 14 pages [Retrieved on Nov. 9, 2021], Retrieved from the Internet: URL: "title=" Link: https://www.nutanix.dev/2020/12/16/from-there-to-here-from-here-to-there-containers-are-everywhere/>>https://www.nutanix.dev/2020/12/16/from-there-to-here-from-here-to-there-containers-are-everywhere/.

Karbon., "Kubernetes Management Solutions for Enterprise," Management Made Simple, 2021, Nutanix, Retrieved from the Internet at: https://www.nutanix.com/products/karbon, 12 pages.

Kralj M., "How to Orchestrate the Modern Cloud with Kubernetes," Jul. 2020, Software Engineering Blog, retrieved from the Internet at: https://www.accenture.com/us-en/blogs/software-engineering-blog/kralj-orchestrate-modern-cloud-kubernetes, 7 pages.

"List of Top Software Defined Storage (SDS) Solutions 2021," Software Defined Storage (SDS) Solutions, Swouter Zijlstro, Retrieved from the Internet at: https://www.trustradius.com/software-defined-storage-sds, 17 pages.

Mathenge J., "Containers vs Microservices: What's the Difference?," Jul. 2021, bmc Software/Slogs, Retrieved from the Internet at: https://www.bmc.com/blogs/containers-vs-microservices/, 19 pages.

Nutanix Karbon, Enterprise Kubernetes Made Simple, Datasheet, 2019, Nutanix Inc, 2 pages.

"Software-Defined Storage (SDS) Solutions," 2021, IBM, Reprinted from the Internet at: https://www.ibm.com/storage/software-defined-storage, 15 pages.

Pods [online]. Kubernetes, 2021, 6 pages [retrieved on Nov. 9, 2021]. Retrieved from the Internet: ">" title="Link: https://kubernetes.io/docs/concepts/workloads/pods/>" >https://kubernetes.io/docs/concepts/workloads/pods/.

Portworx Data Services, the Complete Solution for Deploying Production-Grade Data Services on Kubernetes. [online]. Portworx, Inc. 2021, 5 pages. [Retrieved on Nov. 9, 2021]. Retrieved from the Internet: ">" >https://portworx.com/products/portworx-data-services/.

Production-Grade Container Orchestration [online]. Kubernetes, 2021, 6 pages [retrieved on Nov. 9, 2021]. Retrieved from the Internet: ">" title="Link: https://kubernetes.io/>" >https://kubernetes.io/.

Rao G., "Container Storage Architectures: Which is Right for you?," Dec. 2016, Portworx, Retrieved from the Internet at: https://portworx.com/blog/stateful-enterprise-applications-docker/, 5 pages.

Sanglaji M., et al., "Nutanix Karbon: Enterprise-grade Kubernetes Solution," Nov. 28, 2018, 5 pages [online]. [retrieved on Nov. 9, 2021]. Retrieved from the Internet: >https://www.nutanix.com/blog/nutanix-karbon-enterprise-grade-kubernetes-solution.

Solution Brief. Easily Operate a Database-as-a-Service Platform. [online]. Portworx, Inc. 2021, 2 pages [retrieved on Nov. 9, 2021]. Retrieved from the Internet: ">" >https://portworx.com/wp-content/uploads/2021/09/pds-solution-brief.pdf.

What is Container Orchestration, Exactly? Everything to Know [online]. LaunchDarkly, Apr. 28, 2021, 8 pages. [retrieved on Nov. 9, 2021]. Retrieved from the Internet: ">" >https://launchdarkly.com/blog/what-is-container-orchestration-exactly-everything/.

* cited by examiner

200

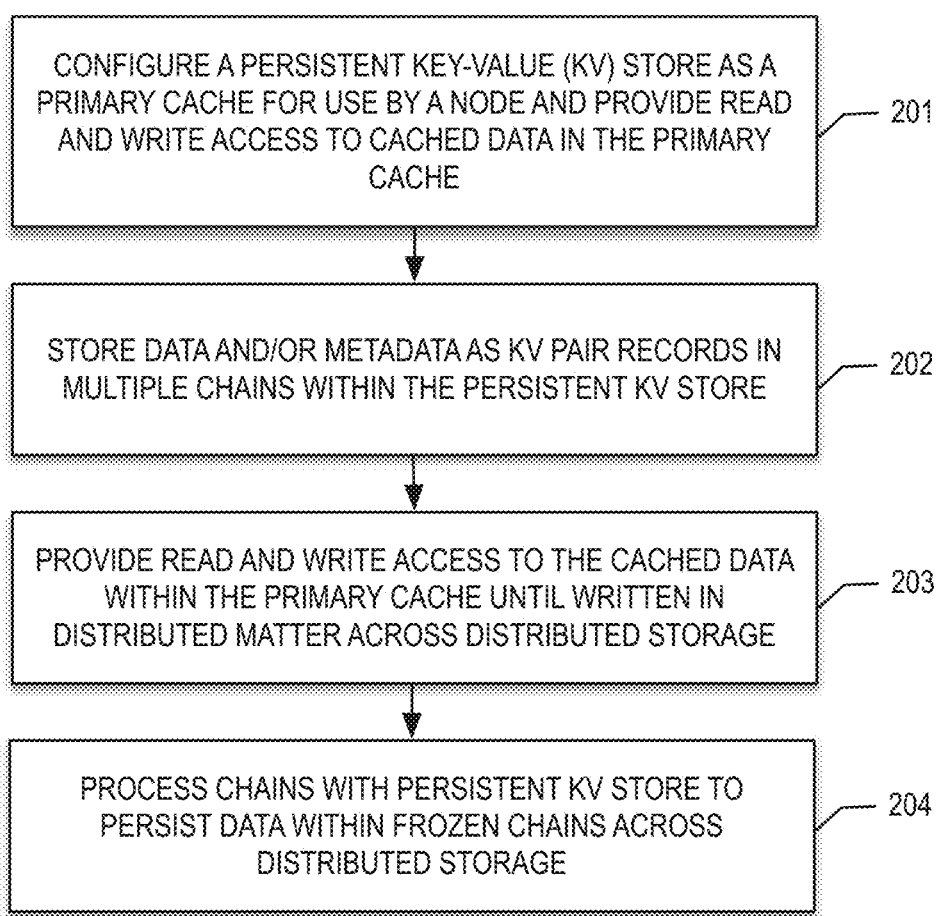

CONFIGURE A PERSISTENT KEY-VALUE (KV) STORE AS A PRIMARY CACHE FOR USE BY A NODE AND PROVIDE READ AND WRITE ACCESS TO CACHED DATA IN THE PRIMARY CACHE — 201

STORE DATA AND/OR METADATA AS KV PAIR RECORDS IN MULTIPLE CHAINS WITHIN THE PERSISTENT KV STORE — 202

PROVIDE READ AND WRITE ACCESS TO THE CACHED DATA WITHIN THE PRIMARY CACHE UNTIL WRITTEN IN DISTRIBUTED MATTER ACROSS DISTRIBUTED STORAGE — 203

PROCESS CHAINS WITH PERSISTENT KV STORE TO PERSIST DATA WITHIN FROZEN CHAINS ACROSS DISTRIBUTED STORAGE — 204

*FIG. 2*

400

RECEIVE STORAGE REQUEST — 401

TYPE OF JOURNAL RECORD? — 402

DATA

METADATA-ONLY

EXISTING ACTIVE DATA JOURNAL RECORD CHAIN? — 403

YES

NO

CREATE NEW ACTIVE DATA JOURNAL RECORD CHAIN — 404

STORE THE DATA AND METADATA ASSOCIATED WITH THE STORAGE REQUEST WITHIN A DATA JOURNAL RECORD OF THE ACTIVE DATA JOURNAL RECORD CHAIN — 405

406 — EXISTING ACTIVE METADATA-ONLY JOURNAL RECORD CHAIN?

YES

NO

407 — CREATE NEW ACTIVE METADATA-ONLY JOURNAL RECORD CHAIN

408 — STORE THE METADATA ASSOCIATED WITH THE STORAGE REQUEST WITHIN A METADATA ONLY JOURNAL RECORD OF THE ACTIVE METADATA ONLY JOURNAL RECORD CHAIN

*FIG. 4*

DYNAMIC STORAGE JOURNALING PARTITIONS FOR EFFICIENT RESOURCE USE AND IMPROVED SYSTEM THROUGHPUT

FIELD

Various embodiments of the present disclosure generally relate to data storage management systems, distributed file systems, and the use of a persistent key-value (KV) store for caching client data, journaling, and/or crash recovery. In particular, some embodiments relate to creation of dynamic storage journaling partitions within the KV store for data journal records containing both data and metadata and for metadata-only journal records containing metadata only so as to decouple these disparate types of journal records and allow them to be independently reclaimed.

BACKGROUND

In support of caching client data, journaling, and/or crash recovery, a cluster of nodes representing a distributed storage system (which may also be referred to herein as a journaling storage system) may journal both data and metadata to a non-volatile storage subsystem (which may be referred to herein as an "NVStore") of a file system of the journaling storage system to record incoming storage operations received from clients of the distributed storage system. For example, when the file system of a node receives a write request, it commits the data to permanent storage before the request is confirmed to the writer. Otherwise, if the storage system were to experience a failure with data existing only in volatile memory, that data would be lost, and underlying file structures could become corrupted.

The nodes of the cluster may be implemented in virtual or physical form. For example, a node or storage system of a distributed storage system may be implemented as a physical storage appliance (e.g., a physical storage server computing device). Alternatively, when a node or storage system is hosted in a cloud environment, for example, in the form of a containerized storage operating system or a storage operating system running on a virtual machine, the storage system may be referred to as a virtual storage system.

Physical storage appliances commonly use battery-backed high-speed non-volatile random access memory (NVRAM) as a journaling storage media to journal writes and accelerate write performance while providing permanence, because writing to memory is much faster than writing to storage (e.g., disk). Journaling storage systems may also implement a buffer cache (which may also be referred to herein as a primary cache or "pcache") in the form of an in-memory cache to cache data that is read from distributed storage (which may include local mass storage devices and/or storage arrays coupled to the nodes) utilized by the cluster as well as data modified by write requests. In this manner, in the event a subsequent access relates to data residing within the buffer cache, the data can be served from local, high performance, low latency storage, thereby improving overall performance of the storage system. In order to provide cluster-level data redundancy, the modified data residing within the buffer cache may be periodically (e.g., every few seconds) flushed to multiple nodes of the cluster for storage to the distributed storage.

The event of saving the modified data to mass storage associated with the local node may be referred to as a consistency point (CP). For example, at a CP point, the file system of the local node may save any modified data within its buffer cache to persistent data storage media. As will be appreciated, when using a buffer cache, there is a small risk of a system failure occurring between CPs which may result in the loss of data modified after the last CP. Consequently, the storage system may also maintain within the NVStore an operation log or journal of certain file system operations that have been performed since the last CP.

SUMMARY

Systems and methods are described for improving latency and throughput for metadata-heavy workloads and/or workloads including metadata bursts by decoupling data journal records and metadata-only journal records. According to one embodiment, a storage request is received by a node of a cluster representing a distributed storage system. Based on an operation associated with the storage request, the node may dynamically determine a type of journal record to be used to log the operation within a persistent key-value (KV) store of the cluster. Responsive to the determined type of journal record being a metadata-only journal record, the node logs the operation and corresponding metadata within a new or an active chain of metadata-only journal records within the persistent KV store. Responsive to the determined type of journal record being a data journal record, the node logs the operation, corresponding data, and the corresponding metadata within a new or an active chain of metadata-only journal records within the persistent KV store.

Other features of embodiments of the present disclosure will be apparent from accompanying drawings and detailed description that follows.

BRIEF DESCRIPTION OF THE DRAWINGS

The present disclosure is best understood from the following detailed description when read with the accompanying figures.

FIG. 2 is a flow chart illustrating an example of a set of operations that can be used for implementing a persistent key-value store for caching client data, journaling, and/or crash recovery in accordance with various embodiments of the present disclosure.

FIG. 4 is a flow diagram illustrating an example of a set of operations for processing storage requests in accordance with various embodiments of the present disclosure.

Figure 1A:
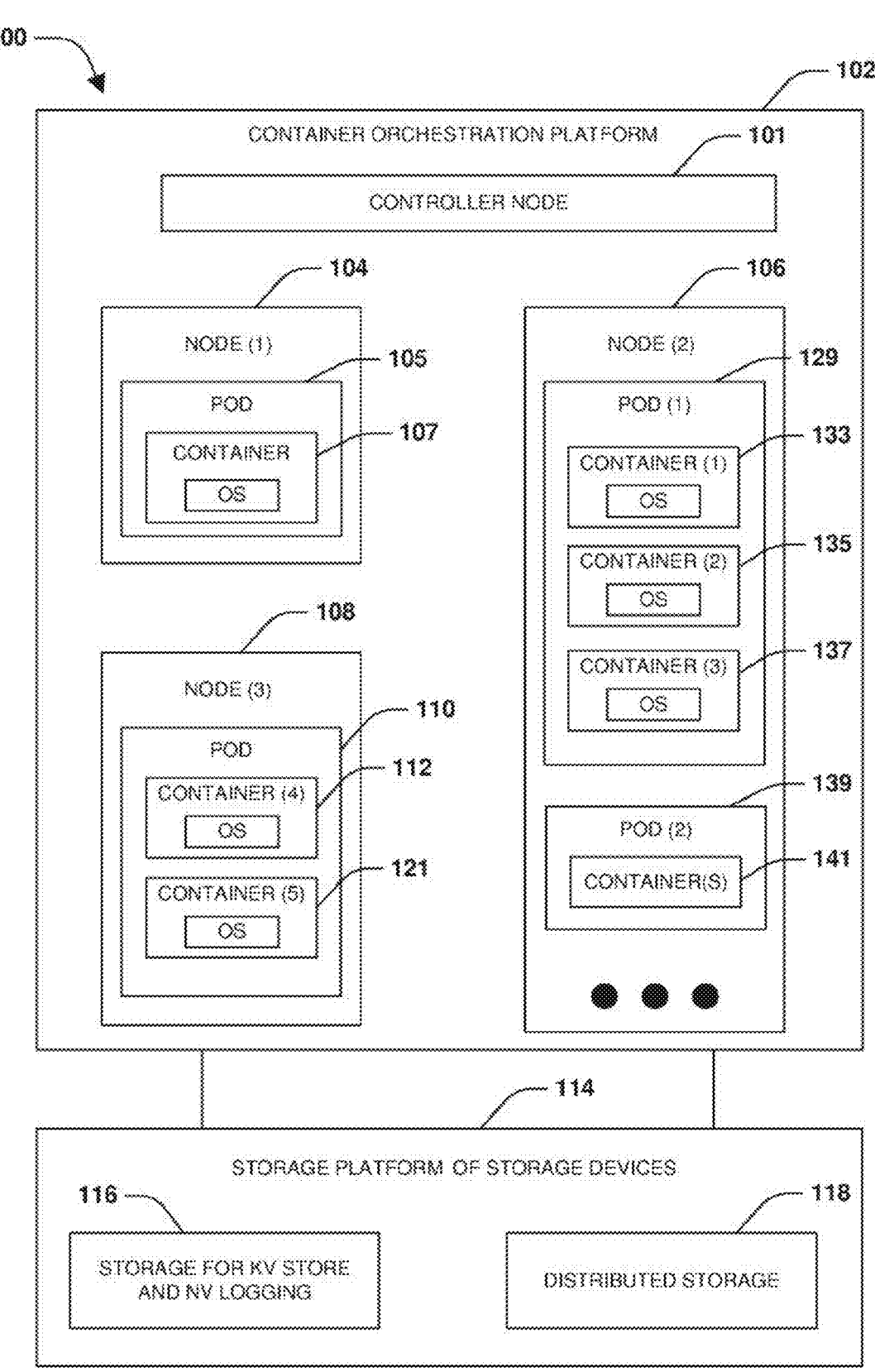
FIG. 1A is a block diagram illustrating an example of various components of a composable, service-based distributed storage architecture in accordance with various embodiments of the present disclosure.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

Systems and methods are described for improving latency and throughput for metadata-heaving workloads and/or workloads including metadata bursts by decoupling journal data and metadata-only records, thereby allowing these records to be reclaimed independently. As noted above, to support caching of client data, journaling, and/or crash recovery, a journaling storage system may journal data and/or metadata associated with received storage operations to an NVStore. The individual NVStore records storing data and/or metadata for a particular storage operation (e.g., create, write, close, and unmap and configuration operations, such as sis-close-create, setattr, unlink, and the like) may be logged in a set or partition called a "chain," representing a unit of operations received during the current CP. The NVStore records are logged according to an order in which storage operations that are logged into the NVStore records are received. The chains may be frozen and made read-only at the beginning of a CP. The data from these frozen chains may be flushed to remote nodes of the distributed storage system and metadata may be written to local persistent storage responsive to a local CP. As described further below, in one embodiment, the data of the NVStore records may include client data payload corresponding to hashed block identifiers (IDs) and the metadata may include information to update a metadata (or slice) file with logical block addresses (LBAs) corresponding to the volume block number and also corresponding block IDs.

As will be appreciated, the space available to journal incoming operations is limited by the NVRAM size of the device on which the NVStore is hosted. To free up space for ongoing journaling, space within the NVStore should be periodically reclaimed to maintain consistent system throughput and latency. Space used by metadata-only records can be reclaimed after completion of a local CP, whereas reclamation of space used by records containing both data and metadata should wait until the data has been flushed to remote nodes of the distributed storage system and the metadata has been persisted locally as a result of completion of a local CP.

When an operation is received and there is no free space available to journal the incoming storage operation requested by a client of the distributed storage system, the operation may be stalled until space reclamation makes available sufficient free space within the NVStore. Such a stall results in increased latency and lower system throughput. In a distributed storage system in which space reclamation in the NVStore is performed at the granularity of a chain and in which both data journal records and metadata-only journal records are collocated within the same chain, NVStore space reclamation may be performed only after all journal records within the chain have been tiered out to local and remote nodes of the distributed storage system. That is, all NVStore records in the chain should have completed both remote node flush and a local CP before being reclaimed. Since a remote node flush of data journal records can span multiple (remote node) CPs, the space occupied by multiple entire chains may remain locked for a significant period of time and may lead to new operations being stalled due to lack of space within the NVStore. Meanwhile, due to the collocation of both data journal records and metadata-only journal records within the same chain, there may be metadata-only journal records for which reclamation is dependent only upon completion of a local CP, thereby unnecessarily retaining metadata space within the NVStore. Consequently, latency and throughput of metadata-heavy workloads or intermittent metadata burst operations involving metadata-only may be negatively impacted by space availability in the NVStore being queued behind other data journaling operations.

Embodiments described herein facilitate expedited and independent space reclamation by differentiating between journal records (which may be referred to herein as "data journal records") that should be retained until both remote node data flush has been completed as well as the completion of local metadata updates (which are performed during a local CP) and those journal records (which may be referred to herein as "metadata-only journal records") for which space is permissible to be reclaimed upon completion of a local CP. Advantageously, by decoupling metadata-only journal records and data journal records and placing them on to separate chains, the metadata portions of the journal can be reclaimed sooner, thereby helping to avoid stalls for space availability for performance of metadata operations. In one embodiment, by dynamically performing storage journaling partitioning including allocating space for data journal records and metadata-only journal records on separate chains within the NVStore, frozen metadata-only journal records may be reclaimed independently and at a higher cadence, for example, as soon as a local CP is reached, than data journal records, which contain both data and metadata. In this manner, latency and throughput of metadata-heavy workloads or intermittent metadata burst operations involving metadata-only may be negatively impacted by space availability in the NVStore being queued behind other data journaling operations. For example, as described further below, according to one embodiment, a storage request is received by a node of multiple nodes of a cluster representing a distributed storage system. Based on an operation associated with the storage request, the node may determine a type of journal record to be used to log the operation within a persistent key-value (KV) store of the cluster. When the determined type of journal record is a metadata-only journal record the node logs the operation and corresponding metadata within a new or an active chain of metadata-only journal records within the persistent KV store. When the determined type of journal record is a data journal record, the node logs the operation, corresponding data, and the corresponding metadata within a new or an active chain of data journal records within the persistent KV store.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Example Computing Environment and Distributed Storage Architecture

FIG. 1A illustrates various components of a composable, service-based distributed storage architecture 100. In some embodiments, the distributed storage architecture 100 may be implemented through a container orchestration platform 102 or other containerized environment, as illustrated by FIG. 1A. A container orchestration platform can automate storage application deployment, scaling, and management. A non-limiting example of a container orchestration platform is Kubernetes. Core components of the container orchestration platform 102 may be deployed on one or more controller nodes, such as controller node 101.

The controller node 101 may be responsible for managing the overall distributed storage architecture 100, and may run various components of the container orchestration platform 102 such as an application programming interface (API) server that implements the overall control logic, a scheduler for scheduling execution of containers on nodes, a storage server where the container orchestration platform 102 stores its data. The distributed storage architecture may comprise a distributed cluster of nodes, such as worker nodes that host and manage containers, and also receive and execute orders from the controller node 101. As illustrated in FIG. 1A, for example, the distributed cluster of nodes (e.g., worker nodes) may comprise a first node 104, a second node 106, a third node 108, and/or any other number of other worker nodes.

Each node within the distributed storage architecture may be implemented as a virtual machine, physical hardware, or other software/logical construct. In some embodiments, a node may be part of a Kubernetes cluster used to run containerized applications within containers and handling networking between the containerized applications across the Kubernetes cluster or from outside the Kubernetes cluster. Implementing a node as a virtual machine or other software/logical construct provides the ability to easily create more nodes or deconstruct nodes on-demand in order to scale up or down based upon current demand.

The nodes of the distributed cluster of nodes may host pods that are used to run and manage containers from the perspective of the container orchestration platform 102. A pod may be a smallest deployable unit a computing resources that can be created and managed by the container orchestration platform 102. The pod may support multiple containers and forms a cohesive unit of service for the applications hosted within the containers. That is, the pod provides shared storage, shared network resources, and a specification for how to run the containers grouped within the pod. In some embodiments, the pod may encapsulate an application composed of multiple co-located containers that share resources. These co-located containers form a single cohesive unit of service provided by the pod, such as where one container provides clients with access to files stored in a shared volume and another container updates the files on the shared volume. The pod wraps these containers, storage resources, and network resources together as single unit that is managed by the container orchestration platform 102.

In some embodiments, a storage application within a first container may access a deduplication application within a second container and a compression application within a third container in order deduplicate and/or compress data managed by the storage application. Because these applications cooperate together, single pod may be used to manage the containers hosting these applications. These containers that are part of the pod may be co-located and scheduled on a same node, such as the same physical hardware or virtual machine. This allows the containers to share resources and dependencies, communicate with one another, and/or coordinate their lifecycles of how and when the containers are terminated.

A node may host multiple containers, and one or more pods may be used to manage these containers. For example, a pod 105 within the first node 104 may manage a container 107 and/or other containers hosting applications that may interact with one another. A pod 129 within the second node 106 may manage a first container 133, a second container 135, and a third container 137 hosting applications that may interact with one another. A pod 139 of the second node 106 may manage one or more containers 141 hosting applications that may interact with one another. A pod 110 within the third node 108 may manage a fourth container 112 and a fifth container 121 hosting applications that may interact with one another.

The fourth container 112 may be used to execute applications (e.g., a Kubernetes application, a client application, etc.) and/or services such as storage management services that provide clients with access to storage hosted or managed by the container orchestration platform 102. In some embodiments, an application executing within the fourth container 112 of the third node 108 may provide clients with access to storage of a storage platform 114. For example, a file system service may be hosted through the fourth container 112. The file system service may be accessed by clients in order to store and retrieve data within storage of the storage platform 114. For example, the file system service may be an abstraction for a volume, which provides the clients with a mount point for accessing data stored through the file system service in the volume.

In some embodiments, the distributed cluster of nodes may store data within distributed storage 118. The distributed storage 118 may correspond to storage devices that may be located at various nodes of the distributed cluster of nodes. Due to the distributed nature of the distributed storage 118, data of a volume may be located across multiple storage devices that may be located at (e.g., physically attached to or managed by) different nodes of the distributed cluster of nodes. A particular node may be a current owner of the volume. However, ownership of the volume may be seamlessly transfer amongst different nodes. This allows applications, such as the file system service, to be easily migrated amongst containers and/or nodes such as for load balancing, failover, and/or other purposes.

In order to improve I/O latency and client performance, a primary cache may be implemented for each node. The primary cache may be implemented utilizing relatively faster storage, such as NVRAM, flash, 3D Xpoint, NVDIMM, etc. For example, the third node 108 may implement a primary cache 136 using a persistent KV store that is stored within storage 116, such as NVRAM. In some embodiments, the storage 116 may be managed by an NVStore and may store the persistent key-value (KV) store used as the primary cache and/or may also store a non-volatile log (NV log). The NV log may be used by a storage operating system to log write operations before the write operations are stored into other storage such as storage hosting a volume managed by the storage operating system.

For example, a write operation may be received from a client application. The write operation may be quickly logged into the NV log because the NV log is stored within the relatively fast storage 116 (e.g., an NVRAM). A response may be quickly provided back to the client application without having to write the data of the write operation to a final destination in the distributed storage 118. In this way, as write operations are received, the write operations are logged within the NV log. So that the NV log does not become full and run out of storage space for logging write operations, a consistency point (CP) may be triggered in order to flush the logged write operations and remove the logged write operations from the NV log to free up storage space for logging of subsequent write operations.

When the NV log becomes full, reaches a certain fullness, or a certain amount of time has passed since a last CP was performed, a CP may be triggered so that the NV log does not run out of storage space for logging write operations. Once the CP is triggered, logged write operations are replayed from the NV log to write data of the logged write operations to the distributed storage 118. Without the use of the NV log, the write operation would be executed and data of the write operation would be distributed across the distributed storage 118. This would take longer than logging the write operation because the distributed storage 118 may be comprised of relatively slower storage and/or the data may be stored across storage devices attached to other nodes. Thus, without the NV log, latency experienced by the client application is increased because a response for the write operation to the client will take longer. In contrast to the NV log where write operations are logged for subsequent replay, read and write operations may be executed using the primary cache 136.

Example Node

Figure 1B:
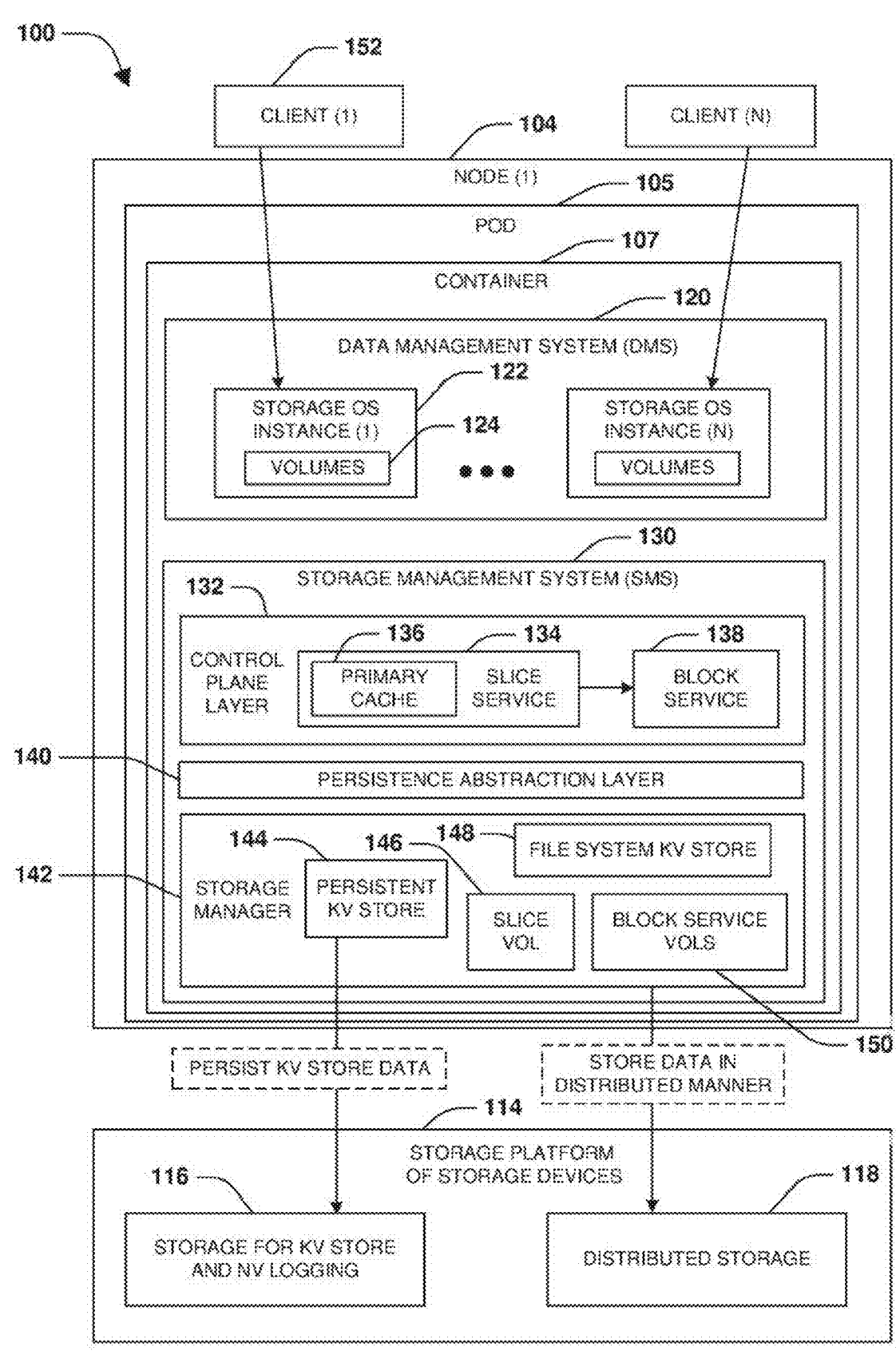
FIG. 1B is a block diagram illustrating an example of a node (e.g., a Kubernetes worker node) in accordance with various embodiments of the present disclosure.

FIG. 1B is a block diagram illustrating an example of a node (e.g., the first node 104 of FIG. 1A) in accordance with various embodiments of the present disclosure. In one embodiment, the node may represent a worker node (e.g., Kubernetes worker node) of a container orchestration platform (e.g., Kubernetes). In the context of the present example, node 104 hosts the container 107 managed by the pod 105. The container 107 may execute an application, such as a storage application that provides clients with access to data stored within the distributed storage 118. That is, the storage application may provide the clients with read and write access to their data stored within the distributed storage 118 by the storage application. The storage application may be composed of a data management system 120 and a storage management system 130 executing within the container 107.

The data management system 120 may represent a frontend component of the storage application through which clients can access and interface with the storage application. For example, the first client 152 may transmit I/O operations to a storage operation system instance 122 hosted by the data management system 120 of the storage application. The data management system 120 routes these I/O operations to the storage management system 130 of the storage application.

The storage management system 130 may be responsible for managing the actual storage of data within storage devices of the storage platform 114, for example, including managing and tracking where the data is physically stored in particular storage devices. The storage management system 130 may also manage the caching of such data before the data is stored to the storage devices of the storage platform 114, for example, by caching data through a primary cache 136 backed by a persistent KV store 144 in a manner that reduces write amplification and improves performance compared to other types of caches that are not implemented as persistent KV stores. In one embodiment, KV record pairs can be resident within the persistent KV store 144 until data of the KV record pairs is to be written to the distributed storage 118 as a final destination. This reduces write amplification because the data is directly written from the persistent KV store 144 to the final destination within the distributed storage 118 as opposed to being stored from the cache to an intermediate storage location that may not be the final destination.

Moreover, because the persistent KV store 144 is a persistent tier, the persistent KV store does not rely upon a file system to offload data for long term storage. This additionally reduces write amplification that would have been incurred from writing cached content from the cache to the volume using a non-volatile log (NV log) of the file system, and then again from the volume to long-term storage through a CP. Additionally, read operations can be locally served from the persistent KV store, which avoids network hops to remote storage locations of the distributed storage that would otherwise introduce additional latency.

In addition, the persistent KV store 144 provides a tier which serves as a transient container for data. Moreover, persistent KV store 144 provides other properties typically not associated with a cache (e.g., journaling, crash protections, resiliency, etc.), while also providing read/write I/O which can be accessed using a KV interface.

Because the storage application, such as the data management system 120 and the storage management system 130 of the storage application, are hosted within the container 107, multiple instances of the storage application may be created and hosted within multiple containers. That is, multiple containers may be deployed to host instances of the storage application that may each service I/O requests from clients. The I/O may be load balanced across the instances of the storage application within the different containers. This provides the ability to scale the storage application to meet demand by creating any number of containers to host instances of the storage application. Each container hosting an instance of the storage application may host a corresponding data management system and storage management system of the storage application. These containers may be hosted on the first node 104 and/or at other nodes.

For example, the data management system 120 may host one or more storage operating system instances, such as the first storage operating system instance 122 accessible to the first client 152 for storage data. In some embodiments, the first storage operating system instance 122 may run on an operating system (e.g., Linux) as a process and may support various protocols, such as Network File System (NFS), Common Internet File System (CIFS), and/or other file protocols through which clients may access files through the first storage operating system instance 122. The first storage operating system instance 122 may provide an API layer through which clients, such as a first client 152, may set configurations (e.g., a snapshot policy, an export policy, etc.), settings (e.g., specifying a size or name for a volume), and transmit I/O operations directed to volumes 124 (e.g., FlexVols) exported to the clients by the first storage operating system instance 122. In this way, the clients communicate with the first storage operating system instance 122 through this API layer. The data management system 120 may be specific to the first node 104 (e.g., as opposed to a storage management system (SMS) 130 that may be a distributed component amongst nodes of the distributed cluster of nodes). In some embodiments, the data management system 120 and/or the storage management system 130 may be hosted within a container 107 managed by a pod 105 on the first node 104.

The first storage operating system instance 122 may comprise an operating system stack that includes a protocol layer (e.g., a layer implementing NFS, CIFS, etc.), a file system layer, a storage layer (e.g., a Redundant Array of Independent Disks (RAID) layer), etc. The first storage operating system instance 122 may provide various techniques for communicating with storage, such as through ZAPI commands, Representational State (REST) API operations, etc. The first storage operating system instance 122 may be configured to communicate with the storage management system 130 through iSCSI, remote procedure calls (RPCs), etc. For example, the first storage operating system instance 122 may communication with virtual disks provided by the storage management system 130 to the data management system 120, such as through Internet Small Computer System Interface (iSCSI) and/or RPC.

The storage management system 130 may be implemented by the first node 104 as a storage backend. The storage management system 130 may be implemented as a distributed component with instances that are hosted on each of the nodes of the distributed cluster of nodes. The storage management system 130 may host a control plane layer 132. The control plane layer 132 may host a full operating system with a frontend and a backend storage system. The control plane layer 132 may form a control plane that includes control plane services, such as a metadata service (e.g., slice service 134) that manages metadata (slice) files used as indirection layers for accessing data on disk, a block service 138 that manages block storage of the data on disk, a transport service used to transport commands through a persistence abstraction layer 140 to a storage manager 142, and/or other control plane services. The slice service 134 may be implemented as a metadata control plane and the block service 138 may be implemented as a data control plane. Because the storage management system 130 may be implemented as a distributed component, the slice service 134 and the block service 138 may communicate with one another on the first node 104 and/or may communicate (e.g., through remote procedure calls) with other instances of the slice service 134 and the block service 138 hosted at other nodes within the distributed cluster of nodes.

In some embodiments of the slice service 134, the slice service 134 may utilize slices, such as slice files, as indirection layers. The first node 104 may provide the first client 152 with access to a logical unit number (LUN) storage or a volume through the data management system 120. The LUN may have N logical blocks that may be 1 kilobyte (KB) each. If one of the logical blocks is in use and storing data, then the logical block has a block identifier of a block storing the actual data. A slice file for the LUN (or volume) has mappings that map logical block numbers of the LUN (or volume) to block identifiers of the blocks storing the actual data. Each LUN or volume will have a slice file, so there may be hundreds of slices files that may be distributed amongst the nodes of the distributed cluster of nodes. A slice file may be replicated so that there is a primary slice file and one or more secondary slice files that are maintained as copies of the primary slice file. When write operations and delete operations are executed, corresponding mappings that are affected by these operations are updated within the primary slice file. The updates to the primary slice file are replicated to the one or more secondary slice files. After, the write or deletion operations are responded back to a client as successful. Also, read operations may be served from the primary slice since the primary slice may be the authoritative source of logical block to block identifier mappings.

In some embodiments, the control plane layer 132 may not directly communicate with the storage platform 114, but may instead communicate through the persistence abstraction layer 140 to a storage manager 142 that manages the storage platform 114. In some embodiments, the storage manager 142 may comprise storage operating system functionality running on an operating system (e.g., Linux). The storage operating system functionality of the storage manager 142 may run directly from internal APIs (e.g., as opposed to protocol access) received through the persistence abstraction layer 140. In some embodiments, the control plane layer 132 may transmit I/O operations through the persistence abstraction layer 140 to the storage manager 142 using the internal APIs. For example, the slice service 134 may transmit I/O operations through the persistence abstraction layer 140 to a slice volume 146 hosted by the storage manager 142 for the slice service 134. In this way, slice files and/or metadata may be stored within the slice volume 146 exposed to the slice service 134 by the storage manager 142.

The storage manager 142 may expose a file system KV store 148 to the block service 138. In this way, the block service 138 may access block service volumes 150 through the file system KV store 148 in order to store and retrieve KV store metadata and/or data. The storage manager 142 may be configured to directly communicate with storage device of the storage platform 114 such as the distributed storage 118 and/or the storage 116 (e.g., NVRAM) used to host a persistent KV store 144 managed by the storage manager 142 for use as a primary cache 136 by the slice service 134 of the control plane layer 132.

It is to be appreciated that the container orchestration platform 102 of FIGS. 1A and 1B is merely one example of a computing environment within which the techniques described herein may be implemented, and that the techniques described herein may be implemented in other types of computing environments (e.g., a cluster computing environment of nodes such as virtual machines or physical hardware, a non-containerized environment, a cloud computing environment, a hyperscaler, etc.).

A non-limiting example of implementing a persistent KV store for caching client data, journaling, and/or crash recovery is illustrated by an exemplary method 200 of FIG. 2 and further described in conjunction with distributed storage architecture 100 of FIGS. 1A, 1B, and FIGS. 3A-C. In one embodiment, a persistent KV store may be used as a primary cache for a node. At block 201, a persistent KV store (e.g., persistent KV store 144) is configured as a primary cache (e.g., primary cache 136) for a node (e.g., the first node 104) of a distributed cluster of nodes, for example, hosted within a container orchestration platform (e.g., container orchestration platform 102).

At block 201, data of write operations is cached with the primary cache as KV record pairs within the persistent KV store. The data may be stored as a value record of the KV record pair and a key value (e.g., a hash of the data) may be stored as a key record of the KV record pair. The key record may be used to uniquely identify and reference the value record. Read operations may be executed to read the cached data from the primary cache (e.g., read a value record of data in the persistent KV store that is referenced by a key record).

Figure 3A:
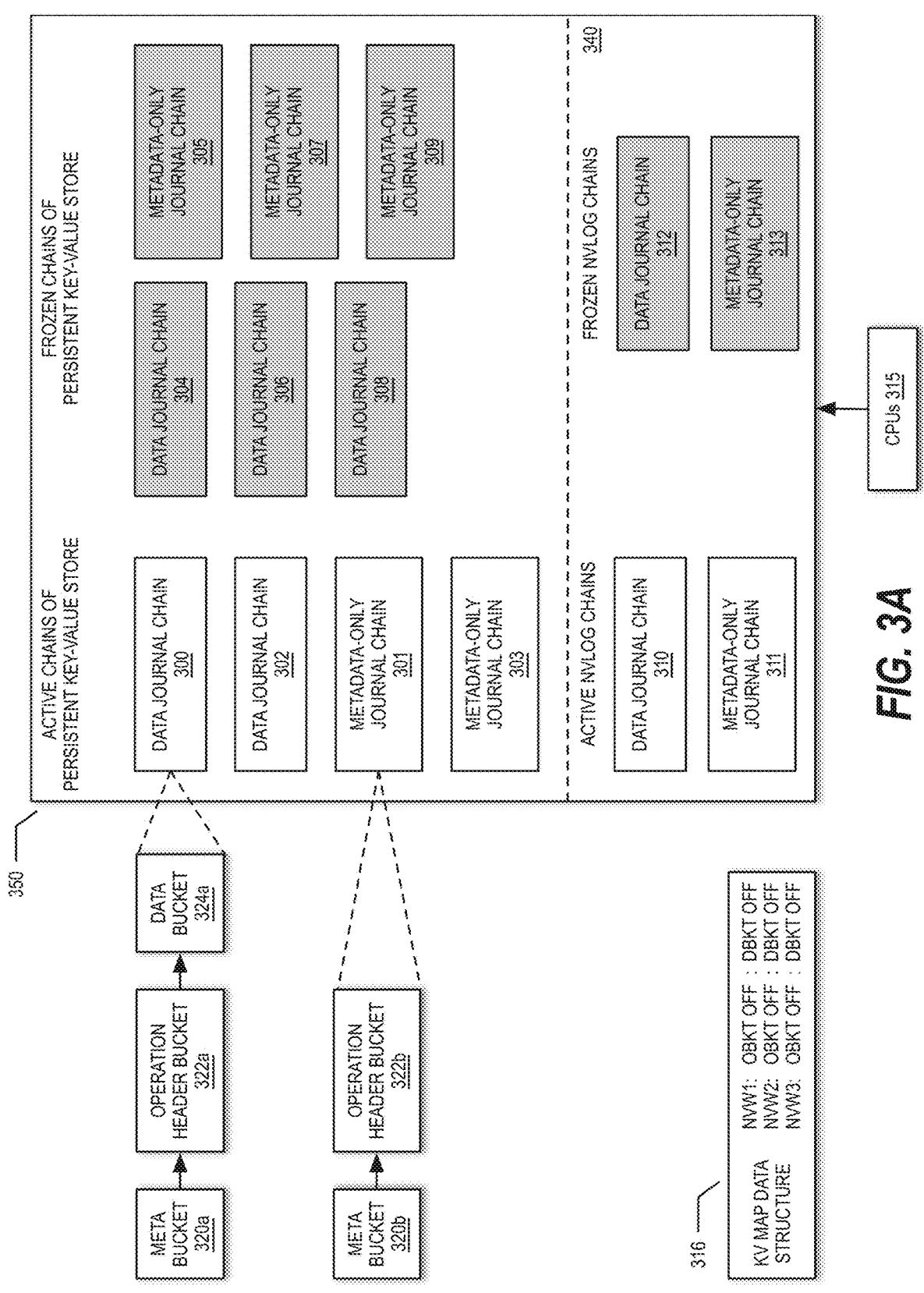
FIG. 3A is a block diagram illustrating an example of various chains stored within a persistent key-value store in accordance with various embodiments of the present disclosure.

FIG. 3A illustrates a layout of a persistent key-value store 350 (analogous to persistent KV store 144). A node (e.g., the first node 104 of a distributed cluster of nodes) may be configured to store data across a distributed storage (e.g., distributed storage 118) managed by nodes of the distributed cluster of nodes, for example, including the first node 104, the second node 106, the third node 108, etc. The data may be cached as KV record pairs within the persistent KV store 350 (e.g., analogous to persistent KV store 144) according to the layout for read and write access until being written in a distributed manner across the distributed storage. Referring back to FIG. 2, during operation 203 of method 200, read and write access is provided to the primary cache. In some embodiments, the node may receive a storage request, for example, an I/O operation (a read or write operation) from a client (e.g., the first client 152). In the context of FIG. 1B, the I/O operation may be processed by the data management system 120 of the container 107, which executes the I/O operation through the storage management system 130 upon the primary cache 136.

In some embodiments, storage (e.g., storage 116 or other type of storage) through which access is provided via a non-volatile storage subsystem (e.g., an NVStore) may be used to store both a persistent KV store (e.g., persistent KV store 330) and a non-volatile log (NV log). The NV log may be used by a storage operating system to log file system operations before the logged file system operations are stored (flushed) to storage, such as where the file system operations are replayed upon a volume stored within a storage device/disk. In some embodiments, the NV log may be used by the storage operating system to log internal file system write operations (e.g., metadata write operations that may set various file attributes, including, for example, a last modified timestamp for a file, or various volume attributes, including, for example, resizing a volume, changing access permissions for the volume, etc.) of a file system managed by the storage operating system for subsequent replay/ execution upon storage. In some embodiments, the persistent KV store is used to cache data of client write operations (e.g., a client writing to a file) in KV record pairs and provide read access to such cached data, as opposed to the internal file system write operations logged through the NV log.

In some embodiments, the persistent KV store and the NV log may share the storage space of the storage and are not confined to certain storage regions/addresses. Because of this sharing of storage space, space management functionality may be implemented by the node for the storage. The space management functionality may track metrics associated with NVRAM storage utilization by the NV log. The metrics may relate to a total amount of NVRAM storage being consumed by the NV log, a percentage of the NVRAM storage being consumed by the NV log, a remaining amount of available NVRAM storage, historic amounts of NVRAM storage consumed by the NV log, etc.

The space management functionality may provide these metrics to the persistent KV store, which may use this information to determine when to write KV record pairs from the persistent KV store to distributed storage (e.g., distributed storage 118). For example, the metrics may indicate a current amount and/or historic amounts of NVRAM storage consumed by the NV log (e.g., the NV log may historically consume 1.5 GB out of 3 GB of the NVRAM storage on average). The metrics may be used to calculate a remaining amount of NVRAM storage and/or a predicted amount of subsequent NVRAM storage that would be consumed. This calculation may be based upon the current amount and/or historic amounts of NVRAM storage consumed by the NV log (e.g., 1.5 GB consumption), a current amount and/or historic amounts of NVRAM storage consumed by the persistent KV store (e.g., 1.2 GB consumption on average by the persistent KV store), and/or a size of the NVRAM storage (e.g., 3 GB). In this way, a determination may be made to write the KV record pairs from the persistent KV store to the distributed storage in order to free up NVRAM storage space so that the NVRAM storage space does not run out. For example, once total consumption reaches or is predicted to reach 2.8 GB, then the KV record pairs may be written from the persistent KV store to the distributed storage.

The space management functionality may track metrics associated with NVRAM storage utilization by the persistent KV store. The metrics may relate to a total amount of NVRAM storage being consumed by the persistent KV store, a percentage of the NVRAM storage being consumed by the persistent KV store, a remaining amount of available NVRAM storage, historic amounts of NVRAM storage consumed by the persistent KV store, etc. The space management functionality may provide these metrics to the NV log, which may be used to determine when to implement a CP to store (flush) logged write operations from the NV log to storage (e.g., replay operations logged within the NV log to a storage device in order to clear the logged operations from the NV log for space management purposes).

For example, the metrics may indicate a current amount and/or historic amounts of NVRAM storage consumed by the persistent KV store (e.g., 1.2 GB consumption on average by the persistent KV store). The metrics may be used to calculate a remaining amount of NVRAM storage (e.g., the remaining amount may correspond to a total storage size of the NVRAM storage minus what storage is currently consumed as indicated by the metrics) and/or a predicted amount of subsequent NVRAM storage that would be consumed (e.g., a historical average amount of NVRAM storage consumed, which may be identified by averaging the metrics tracked over time). This calculation may be based upon the current amount and/or historic amounts of NVRAM storage consumed by the persistent KV store (e.g., 1.2 GB consumption), a current amount and/or historic amounts of NVRAM storage consumed by the NV log (e.g., the NV log may historically consume 1.5 GB out of 3 GB of the NVRAM storage on average), and/or a size of the NVRAM storage (e.g., 3 GB). In this way, a determination may be made to implement the CP to store (flush) logged write operations from the NV log to storage in order to free up NVRAM storage space so that the NVRAM storage space does not run out. For example, once total consumption reaches or is predicted to reach a threshold amount (e.g., 2.8 GB), then the CP may be triggered. In this way, management of the NV log and the persistent KV store may be aware of each other's storage utilization of the NVRAM storage so that storage space within the NVRAM does not become full.

When the persistent KV store physically stores data in the NVRAM storage, the persistent KV store may store the data as KV record pairs that are physically stored within the NVRAM storage. For example, a KV record pair can include a value record and a key record. The value record comprises data (e.g., a file, data being written to a volume, a blob of data, or any other type of data received by the storage application from a client for storage). The key record comprises an identifier used to reference the value record. For example, the key record may include a hash of the data in the value record, which may be used to uniquely identify and reference the value record. That is, a hash function may take the data (e.g., data received by the storage application from the client for storage) as an input, and output a hash value used as the value record. In this manner, the value record may be indexed by the key record so that the value record may be located and retrieved from storage.

KV record pairs may be stored within "chains," as illustrated by FIG. 3A. A chain may represent a unit of storage operations over a period of time, for example, storage requests received from clients during a CP. A chain may be represented by a data structure that includes buckets used to store key records and value records. For example, KV record pairs may be stored within an active chain until the active chain becomes full. That is, an active chain may have a limit as to how many KV record pairs can be stored within the active chain until the active chain is considered full (e.g., 500 KV record pairs or any other number). An active chain is a chain available for storing new KV record pairs. Once full, the active chain may be frozen as a frozen chain that is no longer available to store new KV record pairs. Even though the frozen chain can no longer store new KV record pairs, in one embodiment, the KV record pairs already within the frozen chain are available to read. KV record pairs within the frozen chain are then stored from the persistent KV store to the distributed storage of the storage platform. Because a single application may be allowed to access a chain at any given point in time (e.g., if two applications attempt to write to the same KV record pair within a chain, then data corruption could result), value record pairs may be stored within multiple chains so that different applications may concurrently access different chains in parallel.

In various embodiments described herein, chains within the persistent KV store may be active chains (those chains shown with a white background) or frozen chains (those chains shown with a gray background) and may also be of different types (e.g., data journal record chains and metadata-only journal record chains). In the context of the present example, the persistent KV store is shown including a first active data journal record chain 300, a second active data journal record chain 302, a first active metadata-only journal record chain 301, and a second active metadata-only journal record chain 303. The persistent KV is also shown including a first frozen data journal record chain 304, a second frozen data journal record chain 306, a third frozen data journal record chain 308, a first frozen metadata-only journal record chain 305, a second frozen metadata-only journal record chain 307, and a third frozen metadata-only journal record chain 309. As will be appreciated, the persistent KV store may include more or fewer active chains.

As exemplified by data journal record chain 300, each data journal record chain (e.g., data journal record chains 300, 302, 304, 306, and 308) may include a meta bucket 320a, an operation header bucket 322a, and a data bucket 324a. As exemplified by metadata only journal record chain 301, each metadata-only journal record chain (e.g., metadata-only journal record chains 301, 303, 305, 307, and 309) may include a meta bucket 320b and an operation header bucket 322b. Examples of these buckets are described further below with reference to FIG. 3B. An individual KV record pair distributed across the operation header bucket 322a and the data bucket 324a may be referred to herein as a data journal record. Similarly, an individual key only record including a key within the operation header bucket 322b or a KV record pair including a key within the operation header bucket 322b and a corresponding NULL value may be referred to herein as a metadata only journal record. As noted above and as described further below, because data journal records include both data and metadata, reclamation of space (memory or storage as the case may be depending upon the physical or virtual nature of the nodes of the distributed storage system) utilized by a data journal record chain may be performed after completion of a local CP (which locally persists the metadata) for each data journal record in the chain and after completion of storage of the data for each data journal record in the chain to remote nodes of the distributed storage system (which may be referred to herein as a remote node flush). In contrast, because metadata-only journal records do not include data to be stored in a distributed manner, reclamation of space utilized by a metadata-only journal record chain may be performed after completion of a local CP. Advantageously, by decoupling metadata-only journal records and data journal records and placing them on to separate types of chains, metadata-only journal record chains, which are typically available for reclamation faster than data journal record chains as a result of being conditional only upon completion of a local CP, may be reclaimed sooner than if both metadata-only journal records and data journal records were comingled within the same chain.

According to one embodiment, PUT operations may be executed upon active chains that are actively available for storing new KV record pairs to add new KV record pairs to such chains. Similarly, GET operations may be executed upon active chains and/or frozen chains to retrieve information from such chains. As described further below, when an active chain reaches a threshold size or a CP is reached, the active chain may be frozen as a frozen chain. Once frozen, KV record pairs stored within the frozen chain are stored from the storage to the distributed storage in a distributed manner (e.g., KV record pairs may be stored across different storage devices of the distributed storage that are local to different nodes). In some embodiments, read access is provided to the frozen chain, such as while the KV record pairs of the frozen chain are being stored to the distributed storage. Once the KV record pairs and/or other data stored within the frozen chain have been distributed across the distributed storage, a frozen operation header bucket, a frozen meta bucket, and/or a frozen data bucket of the frozen chain may be freed from the storage for use in storing other data.

Figure 3B:
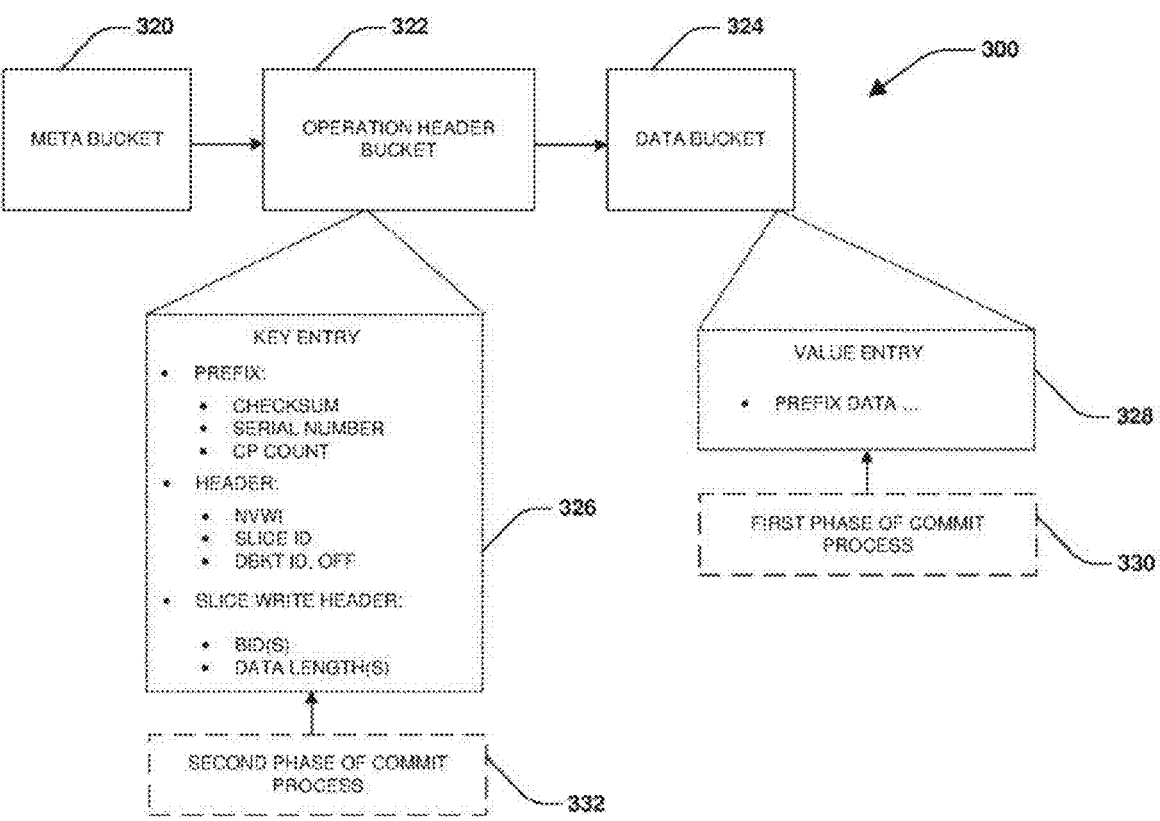
FIG. 3B is a block diagram illustrating an example of a chain stored within a persistent key-value store in accordance with various embodiments of the present disclosure.

An example of the first active data journal record chain 300 that is available for storing new KV record pairs, is illustrated by FIG. 3B. The first active data journal record chain 300 may comprise a meta bucket 320 (analogous to meta bucket 320a of FIG. 3A), an operation header bucket 322 (analogous to operation header bucket 322a of FIG. 3A), and/or a data bucket 324 (analogous to data bucket 324a of FIG. 3A). The meta bucket 320 may include bucket chain metadata that points to the operation header bucket 322. The operation header bucket 322 may include a data bucket identifier and an offset used to point to the data bucket 324. In the case of a data journal record, the KV pair may include a value record (e.g., data received by the storage application from the client for storage) and a key record (a unique identifier for the data). In the case of a metadata-only journal record, the KV pair may include a key record and a NULL value record.

Figure 3C:
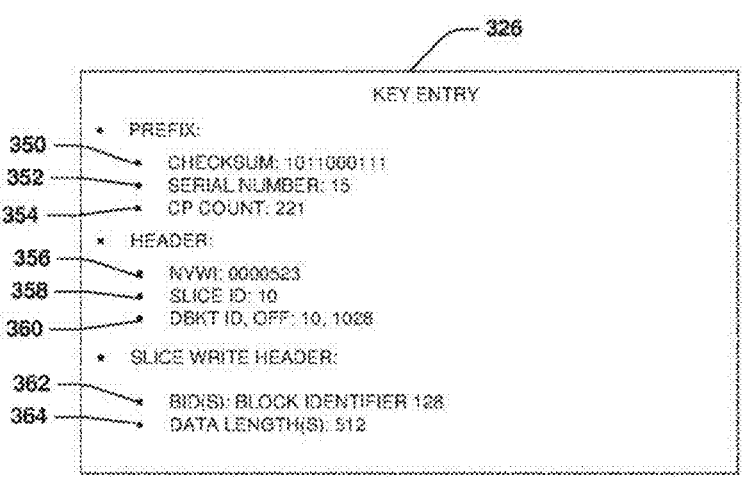
FIG. 3C is a block diagram illustrating an example of a key entry for a key record of a key-value record pair in accordance with various embodiments of the present disclosure.

For the KV record pair, the operation header bucket 322 may be populated with a key entry 326 used to record the key record of the KV record pair, which is further illustrated by FIG. 3C. The key record within the key entry 326 may correspond to a unique identifier for the value record of the KV record pair. For example, the value record (data) may be input into a hash function that creates a hash of the value record as the unique identifier. Because the key record is a unique identifier for the value record, the key record may be used to reference and locate the value record. In this way, the key record may be used to index the value record. The data bucket 324 may be populated with a value entry 328 used to record the value record of the KV record pair. The value record within the value entry 328 may comprise the actual data of the KV record pair (e.g., a file, data being written to a volume, a blob of data, or any other type of data received by the storage application from a client for storage).

In some embodiments, a two-phase commit process is performed to store the KV record pair for data journal records. For example, during a first phase 330, the value entry 328 may be stored within the data bucket 324 and during a second phase 332, subsequent to successful completion of the first phase 330, the key entry 325 may be stored within the operation header bucket 322. This two-phase commit process provides strict order and atomicity guarantees because the value entry 328 (data) is stored before the key entry 325 (e.g., a unique identifier referencing the data). This ensures that there is not an instance where the key entry 325 (e.g., the unique identifier referencing the data) has been persisted but a failure occurs before the value entry 328 (data) has been persisted, thus leaving a reference to non-existent data.

A prefix may be assigned to the key entry 326 and the value entry 328. In some embodiments, the same prefix may be assigned to both the key entry 326 and the value entry 328 so that prefix data of prefixes for the key entry 326 and the value entry 328 may be compared to validate the integrity of the key entry 326 and the value entry 328. The prefix may comprise prefix data. In some embodiments, the prefix data comprises a checksum 350 that may be used to validate the integrity of the key entry 326 and/or the value entry 328. For example, the storage management system 130 may implement checksum functionality that takes information within the key entry 326 and/or the value entry 328 as input, and outputs a checksum with a value of "1011000111" that can be used to verify the information within the key entry 326 and/or the value entry 328. In some embodiments, the prefix data comprises a serial number 352 with a value of "15" of a write operation that created the KV record pair. For example, monotonically increasing serial numbers may be assigned to write operations, such as the write operation that wrote the value record tracked by the key entry 326. For example, the data management system 120 may assign the serial numbers as the write operations are received from the clients such as the first client 152. Accordingly, the write operation may be assigned the serial number 352 with the value of "15" (e.g., the write operation may be the 15$^{th}$ write operation received), and thus the serial number 352 with the value of "15" may be included within the prefix data.

In some embodiments, the prefix data comprises a CP count 354 with a value of "221" for a CP that included the write operation that wrote the value record tracked by the key entry 326 (e.g., the CP may be the 2215 CP performed). For example, operations may be logged by a storage file system until a CP is reached (e.g., a log becomes full or a certain amount of time has occurred since a last CP). Once the CP is reached, the operations are replayed by writing data of the operations to storage. The CP is assigned a consistent point count by the storage operation system, such as a monotonically increasing number. In this way, the CP count 354 with the value of "221" for the CP that replayed the write operation is stored within the prefix. The prefix data may be used to subsequently verify and validate the key entry 326, the value entry 328, the first active chain 300, and/or the buckets within the first active chain 300.

The key entry 326 may also comprise a header. The header may be populated with a data bucket identifier and offset 360 used to point to the data bucket 324. For example, the value record may be stored within the data bucket 324 having a data bucket identifier of 10, and may be stored at an offset of 1028. The header may be populated with a slice identifier 358 of a slice used by the slice service 134 to track the value record. For example, the slice may be assigned the slice identifier 358 of 10, which may be used to locate the slice. The header may comprise a global virtual write index value (NVWI) 356 corresponding to a global sequentially incrementing record number of 0000523 for a write operation (e.g., a PUT operation) that wrote the value record of the KV record pair.

In some embodiments, global virtual write index values may be assigned to KV record pairs. The global virtual write index values may be global sequentially incrementing record numbers for PUT operations associated with the KV record pairs, which may be stored within key entries for the KV record pairs. The global virtual write index values may be used to perform cross-chain validation and verification by determining whether there are any missing global virtual write index values. Any missing global virtual write index values may be indicative of missing key or value entries since the global virtual write index values may be unique monotonically increasing numbers. The key entry 326 may also comprise a slice write header comprising block identifiers of blocks storing the value record and/or data lengths of the blocks (e.g., block 128 having a length of 512 kb may store the value record).

In some embodiments, a two-phase commit process is performed to store a KV record pair into the persistent KV store, as illustrated by FIG. 3B. In some embodiments, a PUT operation to store the KV record pair may not be replied back to a client as successful until both phases have been successfully performed. The two-phase commit process may be performed to provide ordering and/or atomicity guarantees. As part of the two-phase commit process, a first phase is performed to record a value record of the KV record pair as a value entry within a chain. During a second phase, a key record of the KV record pair is recorded as a key entry within the chain. In some embodiments, the second phase may be performed only after the first phase has successfully completed. If there is a failure during the first phase, then neither the key record nor the value record is stored within the chain, and thus there is no corrupt data. If there is a failure after the first phase but before completion of the second phase, then the value record will have been stored within the chain but not the key record. The value record may subsequently be freed. With this ordering, there will not be an instance where the key record, but not the value record, is stored, which would otherwise result in the key record referencing invalid or missing data (the value record that was never stored due to the failure). In this way, FIG. 3B illustrates how the two-phase commit process is used to store the KV record pair within the first active chain 300.

Returning to FIG. 3A, a KV map data structure 316 may be maintained for the persistent KV store 350. The KV map data structure 316 may be populated with mappings between keys/values and corresponding KV metadata used to identify virtual addresses (e.g., offsets within buckets) for accessing key records and value records. For example, a first mapping may map a first global virtual write index value NVWI1 to a first operation header bucket offset to a first data bucket offset. The first global virtual write index value NVWI1 may have been assigned to a PUT operation for a first KV record pair of a first key record and a first value record. The first operation header bucket offset may be an offset within an operation header bucket of where a key entry of the first key record is located. The first data bucket offset may be an offset within a data bucket of where a value entry of the first value record is located. A second mapping may map a second global virtual write index value NVWI2 to a second operation header bucket offset to a second data bucket offset. The second global virtual write index value NVWI2 may have been assigned to a PUT operation for a second KV record pair of a second key record and a second value record. The second operation header bucket offset may be an offset within an operation header bucket of where a key entry of the second key record is located. The second data bucket offset may be an offset within a data bucket of where a value entry of the second value record is located. The KV map data structure 316 may be used to quickly locate key records and value records within the persistent KV store 350.

In some embodiments, performance may be improved by performing operations upon different chains by different central processing units (CPUs) 315 at any given point in time using a multi-threaded approach for improved performance. For example, a first processor may perform a first operation upon a first KV record pair within a first chain. A second processor may be allowed to concurrently perform a second operation upon a second KV record pair within a second chain different than the first chain. Because different chains are being operated upon, the operations may be performed without locking or blocking one another.

During operation 204, chains within the persistent KV store 350 may be periodically processed in order to determine whether KV records within any of the chains can be stored to the distributed storage. As described further below, in some embodiments, during management of the chains within the persistent KV store 350, a chain may be evaluated to determine whether the chain is an active chain or a frozen chain. For example, an active indicator (e.g., a label, a flag, etc.) may be assigned to a chain if the chain is an active chain (e.g., the number of KV record pairs stored in the chain has not reached a limit such as where an active chain is allowed to store up to 300 KV record pairs). Similarly, a frozen indicator (e.g., a label, a flag, etc.) may be assigned to the chain if the chain is a frozen chain (e.g., the number of KV record pairs stored in the chain has reached the limit of 300 KV record pairs). A non-limiting example of management of the chains within the persistent KV store 350 responsive to local and remote events is described below with reference to FIG. 5.

In one embodiment, a portion 340 of the storage (e.g., storage 116), allocated within the NVStore and used by the persistent KV store 350, may also be used as storage for an NV log. The NV log may maintain a single active data journal record chain 310 and/or a single frozen data journal record chain 312 within the storage 116 at any given point in time and a single active metadata-only journal record chain 311 and/or a single frozen metadata-only journal record chain 313. In some embodiments, a sync DMA transfer mode may be implemented for storing a data payload of an operation within a KV record pair in-line with storing a metadata payload of the operation within the KV record pair. The operation may be logged into a non-volatile log (NV log) and the operation may be replied to in-line with the operation being processed. An async DMA transfer mode may be implemented for queuing a message to log the operation into the NV log for subsequent processing. The sync DMA transfer mode or the async DMA transfer mode may be selected based upon a latency of a backing storage device (e.g., the storage 116), such as where the sync DMA transfer mode may be implemented for lower latency backing storage devices and the async DMA transfer mode may be implemented for higher latency backing storage devices. In some embodiments, the sync DMA transfer mode may provide high concurrency and lower memory usage in order to provide performance benefits. In some embodiments, the sync DMA transfer mode may be used for both NV log and the persistent KV store, such as where the backing storage device is a relatively fast persistent storage device. In some embodiments, the async DMA transfer mode may be used for both NV log and the persistent KV store, such as where a backing storage device is relatively slower media.

FIG. 4 is a flow diagram illustrating an example of a set of operations for processing storage requests in accordance with various embodiments of the present disclosure. The processing described with reference to FIG. 4 may represent an example of the handling of a storage request, for example, received from a client (e.g., client 152) or performed by a file system during block 202 of FIG. 2.

At block 401, a storage request is received. For example, the storage request may be received by a data management system (e.g., DMS 120) of a node (e.g., the first node 104) of a distributed cluster of nodes.

At decision block 402, a determination is made regarding the type of journal record to be used to log the storage request to a persistent KV store (e.g., persistent KV store 350) of the distributed cluster of nodes. When the type of journal record to be used to log the storage request is a data journal record, processing continues with decision block 403; otherwise, when the type of journal record to be used to log the storage request is a metadata-only journal record, processing branches to decision block 406. According to one embodiment, data journal records are used for I/O operations (e.g., a write operation) having a data payload, whereas metadata-only journal records may be used to log internal file system write operations (e.g., metadata write operations that may set various file attributes, including, for example, a last modified timestamp for a file, or various volume attributes, including, for example, resizing a volume, changing access permissions for the volume, etc.) having no data payload and involving metadata-only. In one embodiment, policies may be associated with or assigned to various types of storage requests and such policies may be used to perform the determination of decision block 402.

At decision block 403, a determination is made regarding whether there is an existing active data journal record chain (e.g., one of data journal record chains 300, 302, or 310) to which a new data journal record relating to the storage request at issue may be added. If so, processing branches to block 405; otherwise, processing continues with block 404.

At block 404, a new active data journal record chain is created within the persistent KV store to which new data journal records may be added.

At block 405, the data and metadata associated with the storage request is stored within a data journal record of the active data journal record chain. For example, as described above a PUT operation may be executed on the active chain to store a new KV record pair to the active data journal record chain. In one embodiment, the PUT operation may be a blocking call. That is, if insufficient space is available within the persistent KV store to complete the PUT operation, the PUT operation may wait until space is reclaimed within the persistent KV store.

At decision block 406, a determination is made regarding whether there is an existing active metadata-only journal record chain (e.g., one of metadata-only journal record chains 301, 303, or 311) to which a new metadata-only journal record relating to the storage request at issue may be added. If so, processing branches to block 408; otherwise, processing continues with block 407.

At block 407, a new metadata-only journal record chain is created within the persistent KV store to which new metadata-only journal records may be added.

At block 405, the metadata associated with the storage request is stored within a metadata-only journal record of the active metadata-only journal record chain. For example, as described above a PUT operation may be executed on the active chain to store a new KV record pair to the active metadata-only journal record chain. In one embodiment, the PUT operation may be a blocking call. That is, if insufficient space is available within the persistent KV store to complete the PUT operation, the PUT operation may wait until space is reclaimed within the persistent KV store.

Figure 5:
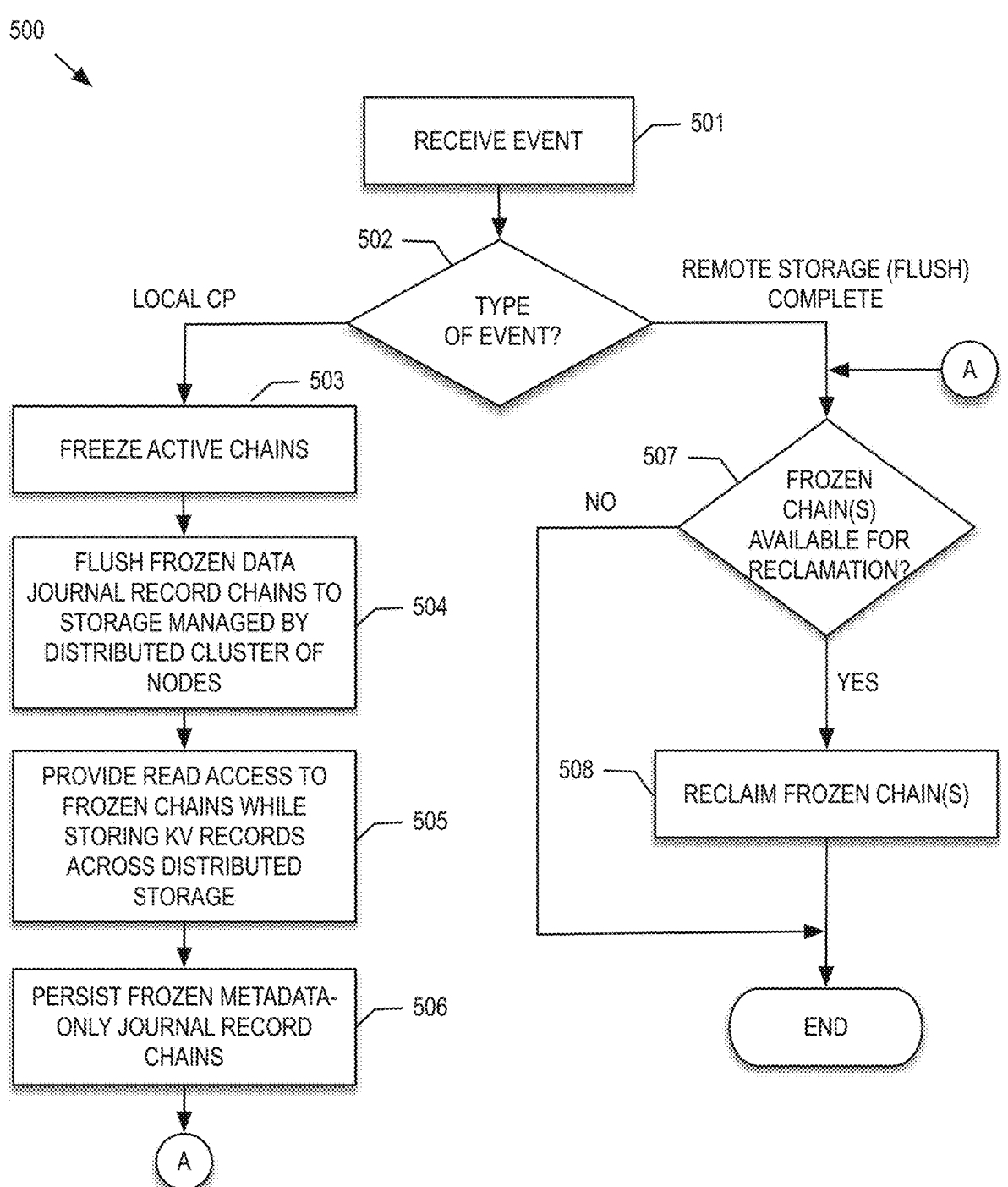
FIG. 5 is a flow diagram illustrating an example of a set of operations for handling local and remote events relating to a persistent key-value store in accordance with various embodiments of the present disclosure.

FIG. 5 is a flow diagram illustrating an example of a set of operations for handling local and remote events relating to a persistent key-value store in accordance with various embodiments of the present disclosure. The processing described with reference to FIG. 5 represents a non-limiting example of how chains may be processed within block 204 of FIG. 2.

At block 501, an event is received by the file system of a node (e.g., the first node 104) of a distributed cluster of nodes.

At decision block 502, a determination is made regarding the type of event. If the event represents the beginning of a local CP, processing continues with block 503; otherwise if the event represents the completion of storage of flushed data by a remote node, processing branches to decision block 507.

At block 503, active chains in a persistent KV store (e.g., persistent KV store 350) of the distributed cluster of nodes are frozen. For example, the active chains may be marked, flagged, or otherwise labeled as frozen and made read-only.

At block 504, frozen data journal record chains (e.g., data journal record chains 304, 306, 308, and 312) are flushed. For example, the persistent KV store may be evaluated to identify frozen data journal record chains within the persistent KV store and the data journal records for each frozen data journal record chain may be flushed. In one embodiment, the global virtual write index values (NVWIs) associated with data journal records of a particular frozen data journal record chain may be sequentially flushed to cause the KV record at issue to be stored across the distributed storage (e.g., distributed storage 118).

At block 505, read access may continue to be provided to frozen chains while storing KV records across the distributed storage. For example, GET operations for global virtual write indices (NVWIs) of a data journal records within a particular frozen data journal record chain may continue to be served while flushing of the particular frozen data journal record chain is in process.

At block 506, frozen metadata-only journal record chains (e.g., metadata-only journal record chains 305, 307, 309, and 312) are flushed. For example, the persistent KV store may be evaluated to identify frozen metadata-only journal record chains within the persistent KV store and the metadata-only journal records for each frozen metadata-only journal record chain may be flushed. In one embodiment, the global virtual write index values (NVWIs) associated with metadata-only journal records of a particular frozen metadata-only journal record chain may be sequentially flushed to cause the KV record at issue to be persisted to local storage. Processing may then continue with decision block 507.

At decision block 507, a determination is made regarding whether any frozen chains (frozen data journal record chains and/or metadata-only record chains) are available for reclamation. If so, processing continues with block 508; otherwise event processing is complete. In one embodiment, a particular frozen data journal record chain is available for reclamation after both a local CP has been completed (to persist the metadata to local storage) and storage of the data flushed to remote nodes of the distributed storage system has been completed for all data journal records in the particular frozen data journal record chain, whereas a particular frozen metadata-only journal record chain is available for reclamation after a local CP has been completed for each metadata-only journal record in the particular frozen metadata-only journal record chain. As local CPs are completed and as remote storage of flushed data is completed, corresponding metadata-only journal records and/or data journal records (or their respective global virtual write indices (NVWIs)) may be tagged as appropriate to facilitate reclamation availability. In one embodiment, policies may be associated with or assigned to chains, for example, when they are created and such policies may be used to perform the determination of decision block 502.

At block 508, the space associated any frozen chains identified in block 507 may be reclaimed to allow reuse of such space for subsequently created active chains.

While in the context of the examples described with reference to FIGS. 2, 4, and 5, a number of enumerated blocks are included, it is to be understood that other examples may include additional blocks before, after, and/or in between the enumerated blocks. Similarly, in some examples, one or more of the enumerated blocks may be omitted and/or performed in a different order.

Figure 6:
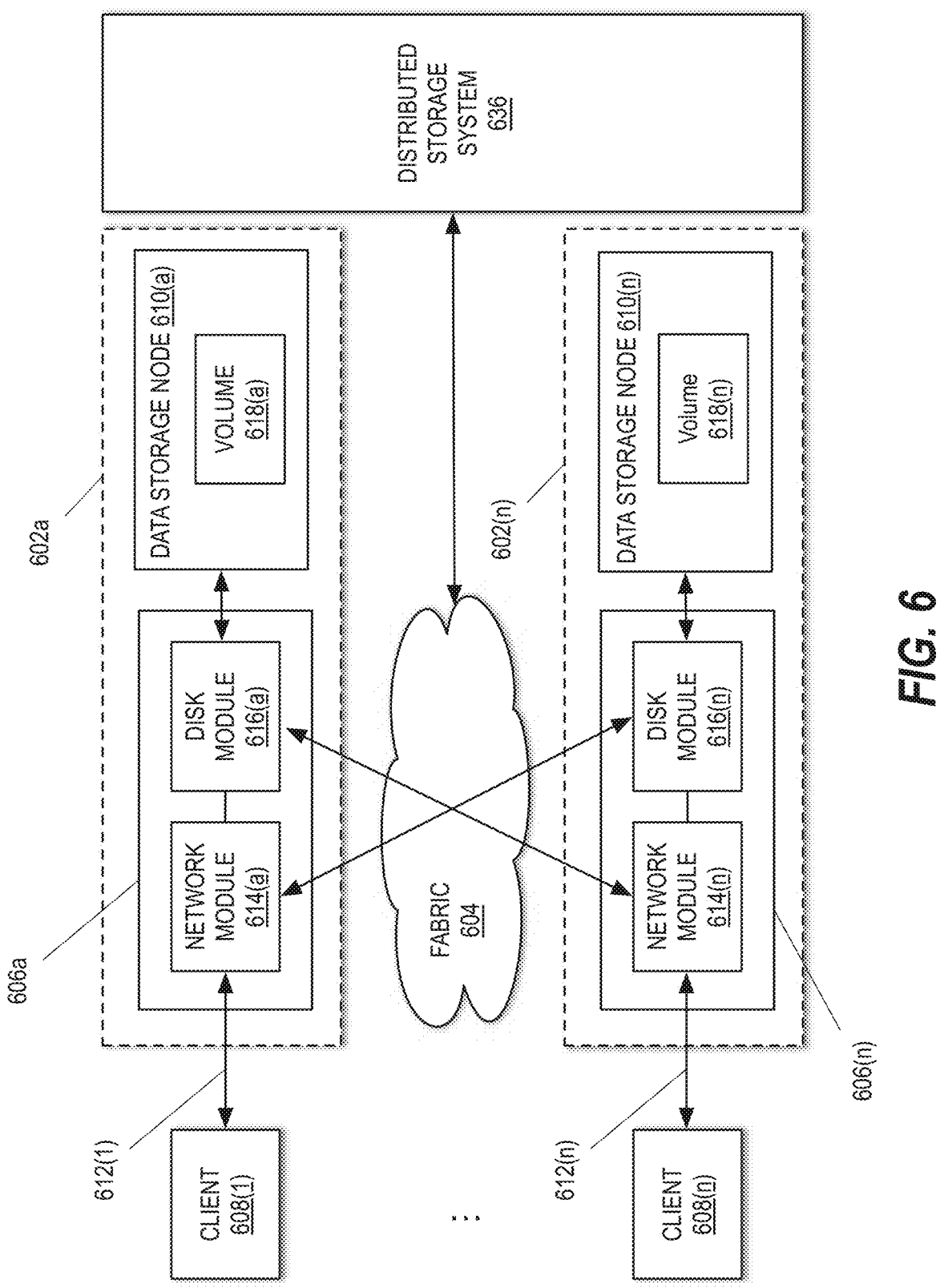
FIG. 6 is a block diagram illustrating an example of a clustered network environment with exemplary nodes in accordance with various embodiments of the present disclosure.

FIG. 6 is a block diagram illustrating an example of a clustered network environment 600 with exemplary nodes in accordance with various embodiments of the present disclosure. The clustered network environment 600 may implement one or more aspects of the techniques described and illustrated herein is shown in FIGS. 2, 4, and/or 5. The clustered network environment 600 includes data storage apparatuses 602(1)-602(n) that are coupled over a cluster or cluster fabric 604 that includes one or more communication network(s) and facilitates communication between the data storage apparatuses 602(1)-602(n) (and one or more modules, components, etc. therein, such as, computing devices 606(1)-606(n), for example), although any number of other elements or components can also be included in the clustered network environment 600 in other examples.

In accordance with one embodiment of the disclosed techniques presented herein, a persistent KV store may be implemented for the clustered network environment 600. The persistent KV store may be implemented for the computing devices 606(1)-606(n). For example, the persistent KV store may be used to implement a primary cache for the computing device 606(1) so that data may be cached by the computing device 606(1) as KV record pairs within the persistent KV store. Operation of the persistent KV store is described further in relation to FIGS. 1-5.

In this example, computing devices 606(1)-606(n) can be primary or local storage controllers or secondary or remote storage controllers that provide client devices 608(1)-608(n) with access to data stored within data storage devices

610(1)-610(n) and storage devices of a distributed storage system 636. The computing devices 606(1)-606(n) may be implemented as hardware, software (e.g., a storage virtual machine), or combination thereof. The computing devices 606(1)-606(n) may be used to host containers of a container orchestration platform.

The data storage apparatuses 602(1)-602(n) and/or computing devices 606(1)-606(n) of the examples described and illustrated herein are not limited to any particular geographic areas and can be clustered locally and/or remotely via a cloud network, or not clustered in other examples. Thus, in one example the data storage apparatuses 602(1)-602(n) and/or computing device computing device 606(1)-606(n) can be distributed over a plurality of storage systems located in a plurality of geographic locations (e.g., located on-premise, located within a cloud computing environment, etc.); while in another example a clustered network can include data storage apparatuses 602(1)-602(n) and/or computing device computing device 606(1)-606(n) residing in a same geographic location (e.g., in a single on-site rack).

In the illustrated example, one or more of the client devices 608(1)-608(n), which may be, for example, personal computers (PCs), computing devices used for storage (e.g., storage servers), or other computers or peripheral devices, are coupled to the respective data storage apparatuses 602(1)-602(n) by network connections 612(1)-612(n). Network connections 612(1)-612(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 608(1)-608(n) may be general-purpose computers running applications and may interact with the data storage apparatuses 602(1)-602(n) using a client/server model for exchange of information. That is, the client devices 608(1)-608(n) may request data from the data storage apparatuses 602(1)-602(n) (e.g., data on one of the data storage devices 610(1)-610(n) managed by a network storage controller configured to process I/O commands issued by the client devices 608(1)-608(n))), and the data storage apparatuses 602(1)-602(n) may return results of the request to the client devices 608(1)-608(n) via the network connections 612(1)-612(n).

The computing devices 606(1)-606(n) of the data storage apparatuses 602(1)-602(n) can include network or host computing devices that are interconnected as a cluster to provide data storage and management services, such as to an enterprise having remote locations, cloud storage (e.g., a storage endpoint may be stored within storage devices of the distributed storage system 636), etc., for example. Such computing devices 606(1)-606(n) can be attached to the cluster fabric 604 at a connection point, redistribution point, or communication endpoint, for example. One or more of the computing devices 606(1)-606(n) may be capable of sending, receiving, and/or forwarding information over a network communications channel, and could comprise any type of device that meets any or all of these criteria.

In an embodiment, the computing devices 606(1) and 606(n) may be configured according to a disaster recovery configuration whereby a surviving computing device provides switchover access to the data storage devices 610(1)-610(n) in the event a disaster occurs at a disaster storage site (e.g., the computing device computing device 606(1) provides client device 612(n) with switchover data access to data storage devices 610(n) in the event a disaster occurs at the second storage site). In other examples, the computing device computing device 606(n) can be configured according to an archival configuration and/or the computing devices 606(1)-606(n) can be configured based on another type of replication arrangement (e.g., to facilitate load sharing). Additionally, while two computing devices are illustrated in FIG. 6, any number of computing devices or data storage apparatuses can be included in other examples in other types of configurations or arrangements.

As illustrated in the clustered network environment 600, computing devices 606(1)-606(n) can include various functional components that coordinate to provide a distributed storage architecture. For example, the computing devices 606(1)-606(n) can include network modules 614(1)-614(n) and disk modules 616(1)-616(n). Network modules 614(1)-614(n) can be configured to allow the computing devices 606(1)-606(n) (e.g., network storage controllers) to connect with client devices 608(1)-608(n) over the storage network connections 612(1)-612(n), for example, allowing the client devices 608(1)-608(n) to access data stored in the clustered network environment 600.

Further, the network modules 614(1)-614(n) can provide connections with one or more other components through the cluster fabric 604. For example, the network module 614(1) of computing device computing device 606(1) can access the data storage device 610(n) by sending a request via the cluster fabric 604 through the disk module 616(n) of computing device computing device 606(n) when the computing device computing device 606(n) is available. Alternatively, when the computing device computing device 606(n) fails, the network module 614(1) of computing device computing device 606(1) can access the data storage device 610(n) directly via the cluster fabric 604. The cluster fabric 604 can include one or more local and/or wide area computing networks (i.e., cloud networks) embodied as Infiniband, Fibre Channel (FC), or Ethernet networks, for example, although other types of networks supporting other protocols can also be used.

Disk modules 616(1)-616(n) can be configured to connect data storage devices 610(1)-610(n), such as disks or arrays of disks, SSDs, flash memory, or some other form of data storage, to the computing devices 606(1)-606(n). Often, disk modules 616(1)-616(n) communicate with the data storage devices 610(1)-610(n) according to the SAN protocol, such as SCSI or FCP, for example, although other protocols can also be used. Thus, as seen from an operating system on computing devices 606(1)-606(n), the data storage devices 610(1)-610(n) can appear as locally attached. In this manner, different computing devices 606(1)-606(n), etc. may access data blocks, files, or objects through the operating system, rather than expressly requesting abstract files.

While the clustered network environment 600 illustrates an equal number of network modules 614(1)-614(n) and disk modules 616(1)-616(n), other examples may include a differing number of these modules. For example, there may be a plurality of network and disk modules interconnected in a cluster that do not have a one-to-one correspondence between the network and disk modules. That is, different computing devices can have a different number of network and disk modules, and the same computing device computing device can have a different number of network modules than disk modules.

Further, one or more of the client devices 608(1)-608(n) can be networked with the computing devices 606(1)-606(n)

in the cluster, over the storage connections 612(1)-612(n). As an example, respective client devices 608(1)-608(n) that are networked to a cluster may request services (e.g., exchanging of information in the form of data packets) of computing devices 606(1)-606(n) in the cluster, and the computing devices 606(1)-606(n) can return results of the requested services to the client devices 608(1)-608(n). In one example, the client devices 608(1)-608(n) can exchange information with the network modules 614(1)-614(n) residing in the computing devices 606(1)-606(n) (e.g., network hosts) in the data storage apparatuses 602(1)-602(n).

In one example, the storage apparatuses 602(1)-602(n) host aggregates corresponding to physical local and remote data storage devices, such as local flash or disk storage in the data storage devices 610(1)-610(n), for example. One or more of the data storage devices 610(1)-610(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 618(1)-618(n) in this example, although any number of volumes can be included in the aggregates. The volumes 618(1)-618(n) are virtual data stores or storage objects that define an arrangement of storage and one or more file systems within the clustered network environment 600. Volumes 618(1)-618(n) can span a portion of a disk or other storage device, a collection of disks, or portions of disks, for example, and typically define an overall logical arrangement of data storage. In one example, volumes 618(1)-618(n) can include stored user data as one or more files, blocks, or objects that may reside in a hierarchical directory structure within the volumes 618(1)-618(n).

Volumes 618(1)-618(n) are typically configured in formats that may be associated with particular storage systems, and respective volume formats typically comprise features that provide functionality to the volumes 618(1)-618(n), such as providing the ability for volumes 618(1)-618(n) to form clusters, among other functionality. Optionally, one or more of the volumes 618(1)-618(n) can be in composite aggregates and can extend between one or more of the data storage devices 610(1)-610(n) and one or more of the storage devices of the distributed storage system 636 to provide tiered storage, for example, and other arrangements can also be used in other examples.

In one example, to facilitate access to data stored on the disks or other structures of the data storage devices 610(1)-610(n), a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 610(1)-610(n) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 610(1)-610(*n*) can have one or more physical ports, wherein each physical port can be assigned a target address (e.g., SCSI target address). To represent respective volumes, a target address on the data storage devices 610(1)-610(*n*) can be used to identify one or more of the LUNs. Thus, for example, when one of the computing devices 606(1)-606(*n*) connects to a volume, a connection between the one of the computing devices 606(1)-606(*n*) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 7:
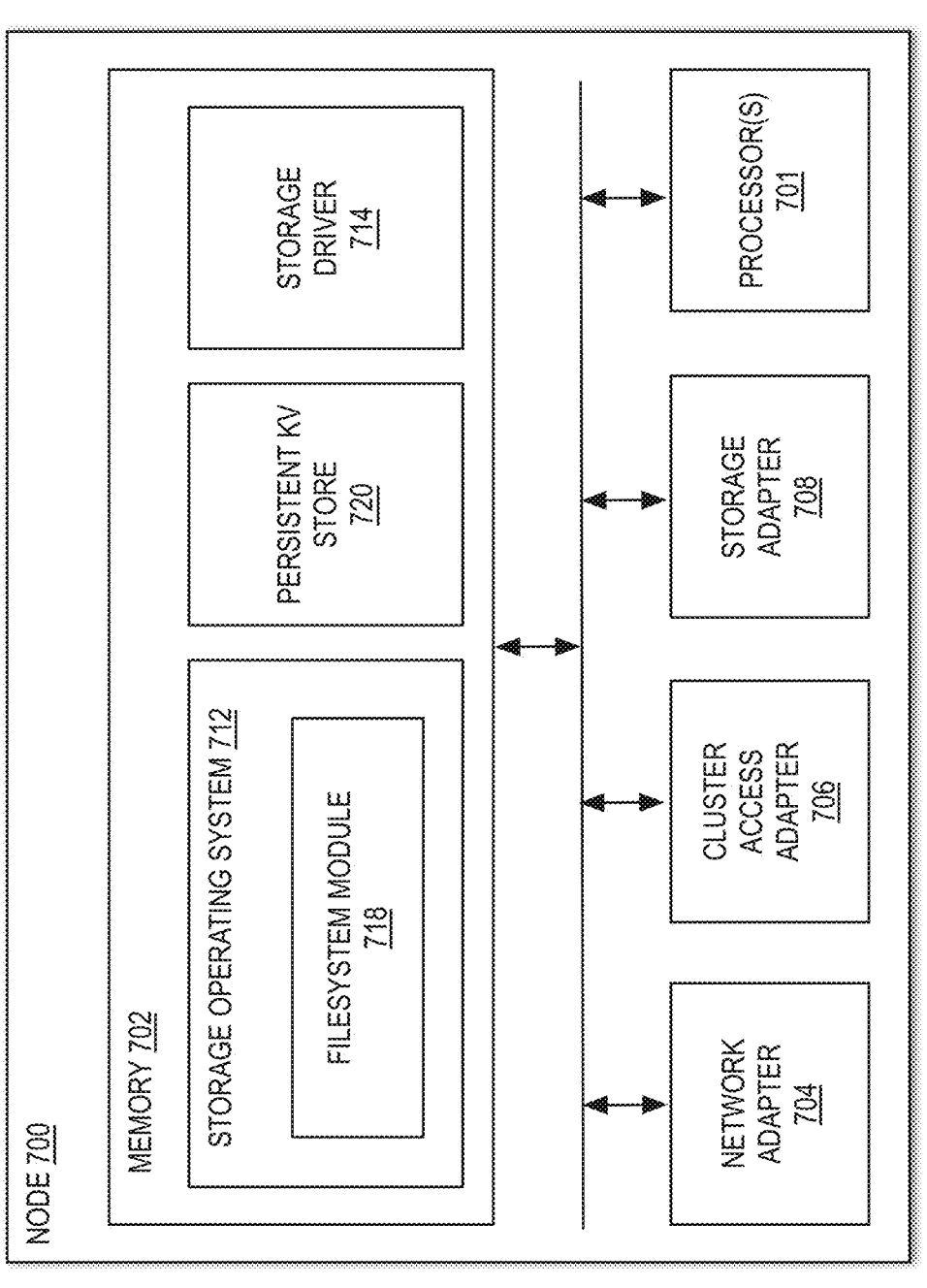
FIG. 7 is a block diagram illustrating an example of various components that may be present within a node that may be used in accordance with various embodiments of the present disclosure.

FIG. 7 is a block diagram illustrating an example of various components that may be present within a node 700 that may be used in accordance with various embodiments of the present disclosure. In the context of the present example, node 700 includes one or more processing resources (e.g., processor(s) 701, such as one or more hardware microprocessors and/or central processing unit core(s)), a memory 702, a network adapter 704, a cluster access adapter 706, and a storage adapter 708 interconnected by a system bus 710.

The node 700 also includes a storage operating system 712 installed in the memory 702 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 704 in this example includes the mechanical, electrical and signaling circuitry needed to connect the node 700 to one or more of the client devices over network connections, which may comprise, among other things, a point-to-point connection or a shared medium, such as a local area network. In some examples, the network adapter 704 further communicates (e.g., using TCP/IP) via a cluster fabric and/or another network (e.g., a WAN) (not shown) with storage devices of a distributed storage system to process storage operations associated with data stored thereon.

The storage adapter 708 cooperates with the storage operating system 712 executing on the node 700 to access information requested by one of the client devices (e.g., to access data on a data storage device managed by a network storage controller). The information may be stored on any type of attached array of writeable media such as magnetic disk drives, flash memory, and/or any other similar media adapted to store information.

In the exemplary data storage devices, information can be stored in data blocks on disks. The storage adapter 708 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 708 and, if necessary, processed by the processor(s) 701 (or the storage adapter 708 itself) prior to being forwarded over the system bus 710 to the network adapter 704 (and/or the cluster access adapter 706 if sending to another node computing device in the cluster) where the information is formatted into a data packet and returned to a requesting one of the client devices and/or sent to another node computing device attached via a cluster fabric. In some examples, a storage driver 714 in the memory 702 interfaces with the storage adapter to facilitate interactions with the data storage devices.

The storage operating system 712 can also manage communications for the node 700 among other devices that may be in a clustered network, such as attached to the cluster fabric. Thus, the node 700 can respond to client device requests to manage data on one of the data storage devices or storage devices of the distributed storage system in accordance with the client device requests.

The file system module 718 of the storage operating system 712 can establish and manage one or more file systems including software code and data structures that implement a persistent hierarchical namespace of files and directories, for example. As an example, when a new data storage device (not shown) is added to a clustered network system, the file system module 718 is informed where, in an existing directory tree, new files associated with the new data storage device are to be stored. This is often referred to as "mounting" a file system.

In the example node 700, memory 702 can include storage locations that are addressable by the processor(s) 701 and adapters 704, 706, and 708 for storing related software application code and data structures. The processor(s) 701 and adapters 704, 706, and 708 may, for example, include processing elements and/or logic circuitry configured to execute the software code and manipulate the data structures.

The storage operating system 712, portions of which are typically resident in the memory 702 and executed by the processor(s) 701, invokes storage operations in support of a file service implemented by the node 700. Other processing and memory mechanisms, including various computer readable media, may be used for storing and/or executing application instructions pertaining to the techniques described and illustrated herein. For example, the storage operating system 712 can also utilize one or more control files (not shown) to aid in the provisioning of virtual machines.

In this particular example, the node 700 also includes a module configured to implement the techniques described herein, as discussed above and further below. In accordance with one embodiment of the techniques described herein, a persistent KV store 720 may be implemented for node 700. The persistent KV store 720 may be located within memory 702, such as NVRAM. The persistent KV store 720 may be used, for example, to implement a primary cache for the node 700 so that data may be cached by the node 700 as KV record pairs within the persistent KV store 720. As noted above, the persistent KV store may also store an NV log. Various example operations on and management of the persistent KV store 720 have been described above with reference to FIGS. 1A, 1B, 2, 3A, 3B, 3C, 4, and 5.

While in the context of the present example, processor(s) 701 are shown as a non-limiting example of a processing resource, those skilled in the art will appreciate other examples of processing resources include microcontrollers, application-specific integrated circuits (ASICs), field programmable gate arrays (FPGAs), and the like and/or other types of electronic circuitry. While in various examples the node 700 may be a physical machine, in other examples the node 700 may be a virtual machine, such as a virtual storage machine.

The examples of the technology described and illustrated herein may be embodied as one or more non-transitory computer or machine readable media, such as the memory 702, having machine or processor-executable instructions stored thereon for one or more aspects of the present technology, which when executed by one or more processing resources, such as processor(s) 701, cause the processing resources to carry out the steps necessary to implement the methods of this technology, as described and illustrated with the examples herein. In some examples, the executable instructions are configured to perform one or more steps of a method described and illustrated later.

Figure 8:
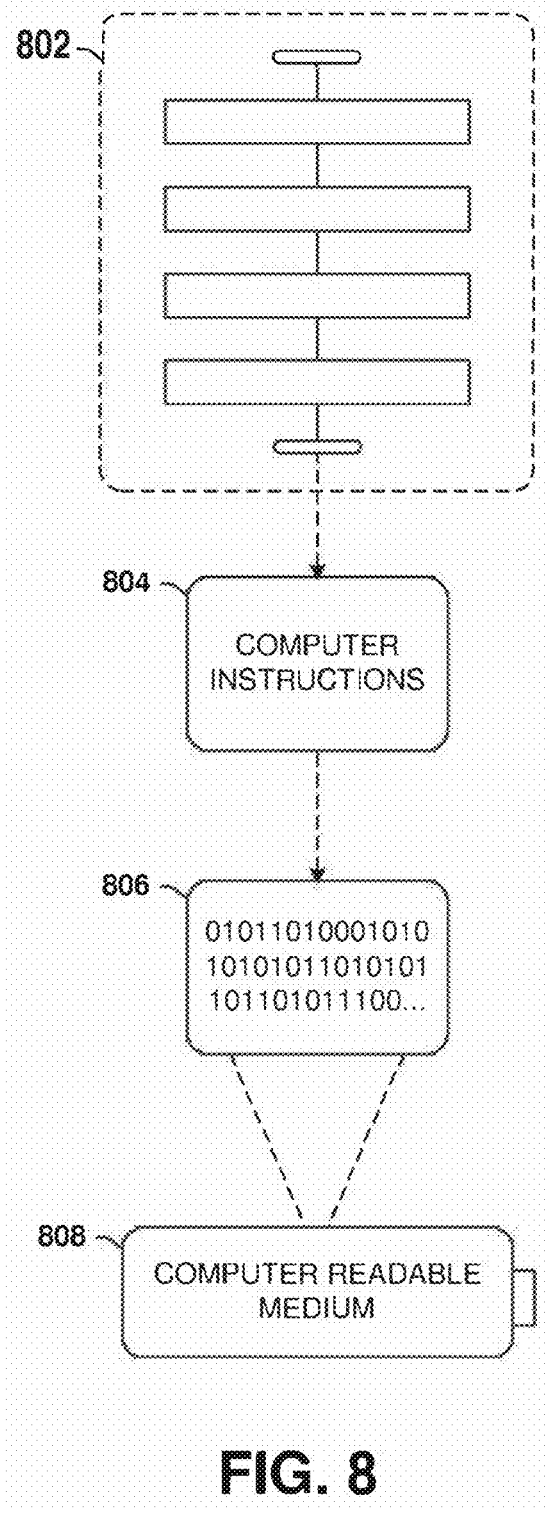
FIG. 8 is an example of a computer readable medium in which various embodiments of the present disclosure may be implemented.

FIG. 8 is an example of a computer readable medium 808 in which various embodiments of the present disclosure may be implemented. In one embodiment, the computer-readable medium 808 may have stored therein processor-executable instructions configured to implement one or more of the techniques presented herein. Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

In the context of the present example, the computer-readable medium 808 (e.g., a non-transitory computer-readable device) may comprise a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises processor-executable computer instructions 804 configured to operate according to one or more of the principles set forth herein. In some embodiments, the processor-executable computer instructions 804 are configured to perform a method 702, such as one or more methods 200, 400, and/or 500 of FIGS. 2, 4, and/or 5, respectively. In some embodiments, the processor-executable computer instructions 704 are configured to implement a system, such as at least some of the exemplary distributed storage architecture 100 of FIGS. 1A-1B and/or at least some of the exemplary system of FIGS. 3A-3C, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

maintaining, within a cluster of a plurality of nodes representing a distributed storage system, an operation log of file system operations that have yet to be flushed to storage of the distributed storage system, including (i) decoupling a plurality of types of journal records from each other by organizing the operation log as a plurality of chains of journal records in which all journal records of a given chain of the plurality of chains of journal records are of a same type of the plurality of types of journal records and (ii) storing the operation log within a persistent key-value (KV) store, wherein the plurality of types of journal records include (a) a data journal record having both data and metadata of a given file system operation at issue and (b) a metadata-only journal record having metadata of the given file system operation at issue;

receiving a storage request by a node of the plurality of nodes;

dynamically determining, by the node, based on an operation associated with the storage request, a type of journal record to be used to log the operation within the persistent KV store from among the plurality of types of journal records;

based on the determined type of journal record being the metadata-only journal record, logging, by the node, the operation and corresponding metadata within a new or an active chain of metadata-only journal records within the persistent KV store;

based on the determined type of journal record being the data journal record, logging, by the node, the operation, corresponding data, and the corresponding metadata within a new or an active chain of data journal records within the persistent KV store; and based on their respective different sets of one or more reclamation dependencies, independently reclaiming space in the persistent KV store associated with a plurality of metadata-only journal records and a plurality of data journal records of respective frozen chains of a plurality of frozen chains within the persistent KV store.

2. The method of claim 1, further comprising responsive to receipt of an indication regarding completion of a consistency point (CP) by the node, causing, by the node, the space used by the plurality of metadata-only journal records of a first frozen chain of the plurality of chains associated with a prior CP to be reclaimed by the persistent KV store.

3. The method of claim 1, further comprising:

after receipt of an indication that processing of data and metadata flushed to a remote node of the plurality of nodes from a data journal record of the plurality of data journal records of a second frozen chain of the plurality of frozen chains has been completed by the remote node, determining, by the node, whether processing of data and metadata of all of the plurality of data journal records has been completed; and after an affirmative determination, causing, by the node, the space used by the plurality of data journal records to be reclaimed by the persistent KV store.

4. The method of claim 1, wherein the persistent KV store is stored within a non-volatile random access memory (NVRAM) of the cluster.

5. The method of claim 1, wherein the plurality of nodes are hosted within a container orchestration platform.

6. The method of claim 1, wherein the persistent KV store is stored within a storage device associated with the cluster.

7. A non-transitory machine readable medium storing instructions, which when executed by one or more processing resources of a node of a plurality of nodes of a cluster representing a distributed storage system, cause the node to:

maintain an operation log of file system operations that have yet to be flushed to storage of the distributed storage system, including (i) decoupling a plurality of types of journal records from each other by organizing the operation log as a plurality of chains of journal records in which all journal records of a given chain of the plurality of chains of journal records are of a same type of the plurality of types of journal records and (ii) storing the operation log within a persistent key-value (KV) store, wherein the plurality of types of journal records include (a) a data journal record having both data and metadata of a given file system operation at issue and (b) a metadata-only journal record having metadata of the given file system operation at issue;

receive a storage request from a client of the distributed storage system or a file system of the node;

determine a type of journal record to be used to log an operation associated with the storage request within the persistent KV store from among the plurality of types of journal records;

based on determining the type of journal record to be used is the metadata-only journal record, log the operation and corresponding metadata within a new or an active chain of metadata-only journal records within the persistent KV store; and based on determining the type of journal record to be used is the data journal record, log the operation, corresponding data, and the corresponding metadata within a new or an active chain of data journal records within the persistent KV store; and based on their respective different sets of one or more reclamation dependencies, independently reclaim space in the persistent KV store associated with a plurality of metadata-only journal records and a plurality of data journal records of respective frozen chains of a plurality of frozen chains within the persistent KV store.

8. The non-transitory machine readable medium of claim 7, wherein the instructions further cause the node to responsive to completion of a local consistency point (CP), issue a call directing the persistent KV store to reclaim the space used by the plurality of metadata-only journal records of a first frozen chain of the plurality of chains associated with the local CP.

9. The non-transitory machine readable medium of claim 7, wherein the instructions further cause the node to:

after completion of flushing of data and metadata to a remote node of the plurality of nodes from a data journal record of the plurality of data journal records of a second frozen chain of the plurality of frozen chains, determine whether processing of data and metadata of all of the plurality of data journal records has been completed; and after an affirmative determination, issue a call directing the persistent KV store to reclaim the space used by the plurality of data journal records of the second frozen chain.

10. The non-transitory machine readable medium of claim 7, wherein the persistent KV store is stored within a non-volatile random access memory (NVRAM) of the cluster.

11. The non-transitory machine readable medium of claim 7, wherein the plurality of nodes are hosted within a container orchestration platform.

12. The non-transitory machine readable medium of claim 7, wherein the new or active chain of metadata-only journal records includes an operation header bucket for recording key entries of key records and metadata of the key records and a meta bucket, pointing to the operation header bucket, for recording bucket chain metadata.

13. The non-transitory machine readable medium of claim 7, wherein the new or active chain of data journal records includes an operation header bucket for recording key entries of key records and metadata of the key records, a data bucket for recording value entries of value records, and a meta bucket, pointing to the operation header bucket, for recording bucket chain metadata.

14. The non-transitory machine readable medium of claim 7, wherein the persistent KV store is stored within a storage device associated with the cluster.

15. A node of a plurality of nodes of a cluster of a distributed storage system comprising:

one or more processing resources; and instructions that when executed by the one or more processing resources cause the node to:

maintain an operation log of file system operations that have yet to be flushed to storage of the distributed storage system, including (i) decoupling a plurality of types of journal records from each other by organizing the operation log as a plurality of chains of journal records in which all journal records of a given chain of the plurality of chains of journal records are of a same type of the plurality of types of journal records and (ii) storing the operation log within a persistent key-value (KV) store, wherein the plurality of types of journal records include (a) a data journal record having both data and metadata of a given file system operation at issue and (b) a metadata-only journal record having metadata of the given file system operation at issue;

receive a storage request from a client of the distributed storage system or a file system operable within the node;

determine a type of journal record to be used to log an operation associated with the storage request within the persistent KV store from among the plurality of types of journal records;

based on determining the type of journal record to be used is the metadata-only journal record, log the operation and corresponding metadata within a new or an active chain of metadata-only journal records within the persistent KV store; and based on determining the type of journal record to be used is the data journal record, log the operation, corresponding data, and the corresponding metadata within a new or an active chain of data journal records within the persistent KV store; and based on their respective different sets of one or more reclamation dependencies, independently reclaim space in the persistent KV store associated with a plurality of metadata-only journal records and a plurality of data journal records of respective frozen chains of a plurality of frozen chains within the persistent KV store.

16. The node of claim 15, wherein the instructions further cause the node to responsive to completion of a local consistency point (CP), issue a call directing the persistent KV store to reclaim the space used by the plurality of metadata-only journal records of a first frozen chain of the plurality of chains associated with the local CP.

17. The node of claim 15, wherein the instructions further cause the node to:

after completion of flushing of data and metadata to a remote node of the plurality of nodes from a data journal record of the plurality of data journal records of a second frozen chain of the plurality of frozen chains, determine whether processing of data and metadata of all of the plurality of data journal records has been completed; and after an affirmative determination, issue a call directing the persistent KV store to reclaim the space used by the plurality of data journal records of the second frozen chain.

18. The node of claim 15, wherein the persistent KV store resides within a non-volatile random access memory (NVRAM) of the cluster.

19. The node of claim 15, wherein the plurality of nodes are hosted within a container orchestration platform.

20. The node of claim 15, wherein the persistent KV store is stored within a storage device associated with the cluster.

\* \* \* \* \*